United States Patent
Kim et al.

(10) Patent No.: US 10,090,986 B2
(45) Date of Patent: Oct. 2, 2018

(54) METHOD AND APPARATUS FOR TRANSMITTING REFERENCE SIGNAL IN MULTIPLE ANTENNA SUPPORTING WIRELESS COMMUNICATION SYSTEM

(71) Applicant: LG ELECTRONICS INC., Seoul (KR)

(72) Inventors: Youngtae Kim, Seoul (KR); Suckchel Yang, Seoul (KR); Hanbyul Seo, Seoul (KR); Kijun Kim, Seoul (KR); Jonghyun Park, Seoul (KR); Hyukjin Chae, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 14/913,294

(22) PCT Filed: Sep. 5, 2014

(86) PCT No.: PCT/KR2014/008378
§ 371 (c)(1),
(2) Date: Feb. 19, 2016

(87) PCT Pub. No.: WO2015/034311
PCT Pub. Date: Mar. 12, 2015

(65) Prior Publication Data
US 2016/0204921 A1    Jul. 14, 2016

Related U.S. Application Data

(60) Provisional application No. 61/874,342, filed on Sep. 5, 2013.

(51) Int. Cl.
*H04L 5/00*    (2006.01)
*H04B 7/0413*    (2017.01)
(Continued)

(52) U.S. Cl.
CPC ......... *H04L 5/0091* (2013.01); *H04B 7/0413* (2013.01); *H04B 7/0469* (2013.01);
(Continued)

(58) Field of Classification Search
CPC ... H04L 5/0091; H04L 5/0023; H04L 5/0048; H04L 5/0053; H04L 12/189;
(Continued)

(56) References Cited

U.S. PATENT DOCUMENTS

2009/0316811 A1* 12/2009 Maeda .............. H04W 74/0833
375/260
2011/0170436 A1* 7/2011 Doan .................... H04B 7/155
370/252
(Continued)

FOREIGN PATENT DOCUMENTS

KR    10-2011-0090645    8/2011
KR    10-2011-0126938    11/2011
(Continued)

OTHER PUBLICATIONS

PCT International Application No. PCT/KR2014/008378, Written Opinion of the International Searching Authority dated Jan. 8, 2015, 16 pages.

*Primary Examiner* — Christopher Crutchfield
*Assistant Examiner* — Tito Pham
(74) *Attorney, Agent, or Firm* — Lee, Hong, Degerman, Kang & Waimey

(57) ABSTRACT

The present invention discloses a method and an apparatus for transmitting a reference signal in a wireless communication system. More specifically, the method comprises configuring a first antenna group on the basis of a plurality of antenna elements configured by a horizontal domain antenna element and a vertical domain antenna element; transmitting a configuration with regard to a specific sub
(Continued)

frame to first terminals through a first antenna group; receiving a sounding reference signal (SRS) through the specific sub frame from the first terminals; selecting at least one second terminal among the first terminals on the basis of the sounding reference signal; and transmitting a channel state information-reference signal (CSI-RS) with respect to the at least one second terminal, wherein the specific sub frame is characterized in that at least a part of a source area is configured by a multicast broadcast single frequency network (MBSFN) sub frame.

13 Claims, 24 Drawing Sheets

(51) Int. Cl.
  *H04B 7/06*    (2006.01)
  *H04L 12/18*    (2006.01)
  *H04W 72/04*    (2009.01)
  *H04B 7/0456*   (2017.01)
  *H04B 7/10*    (2017.01)
  *H04W 72/00*   (2009.01)

(52) U.S. Cl.
  CPC ......... *H04B 7/0478* (2013.01); *H04B 7/0626* (2013.01); *H04B 7/0691* (2013.01); *H04B 7/10* (2013.01); *H04L 5/0023* (2013.01); *H04L 5/0048* (2013.01); *H04L 5/0053* (2013.01); *H04L 12/189* (2013.01); *H04W 72/044* (2013.01); *H04W 72/005* (2013.01)

(58) Field of Classification Search
  CPC .. H04B 7/0469; H04B 7/0478; H04B 7/0626; H04B 7/0691; H04B 7/10; H04W 72/044; H04W 72/005
  See application file for complete search history.

(56) References Cited

U.S. PATENT DOCUMENTS

| | | | |
|---|---|---|---|
| 2011/0243040 A1* | 10/2011 | Khan | H04B 7/0617 370/280 |
| 2012/0063348 A1 | 3/2012 | Guo | |
| 2013/0088996 A1* | 4/2013 | Hara | H04W 88/06 370/252 |
| 2013/0242730 A1* | 9/2013 | Pelletier | H04W 28/0284 370/230 |
| 2014/0086221 A1* | 3/2014 | Davydov | H04W 4/06 370/336 |
| 2014/0153472 A1* | 6/2014 | Phan | H04L 5/0032 370/312 |
| 2014/0177745 A1* | 6/2014 | Krishnamurthy | H04B 7/0413 375/267 |
| 2015/0063095 A1* | 3/2015 | Deng | H04W 8/005 370/221 |

FOREIGN PATENT DOCUMENTS

| | | |
|---|---|---|
| KR | 10-2012-0002875 | 1/2012 |
| KR | 10-2012-0112611 | 10/2012 |

* cited by examiner

FIG. 13
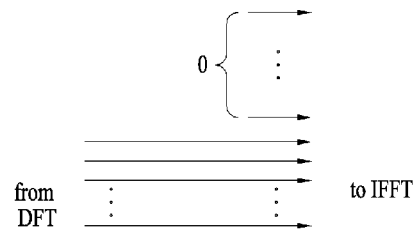
(a)
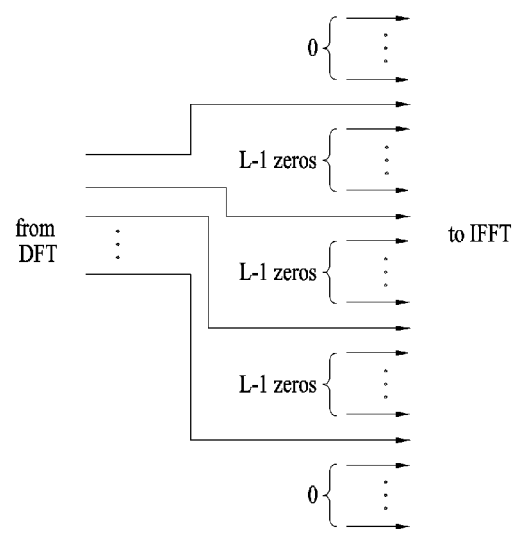
(b)

FIG. 15
Normal CP
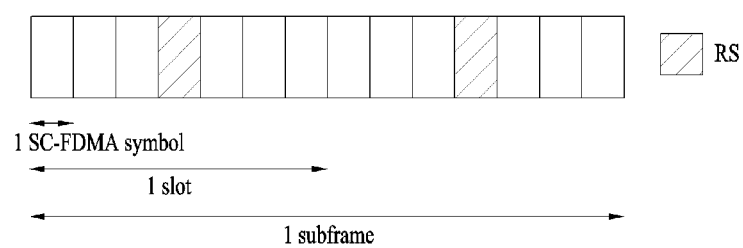
1 SC-FDMA symbol
1 slot
1 subframe
(a)
Extended CP
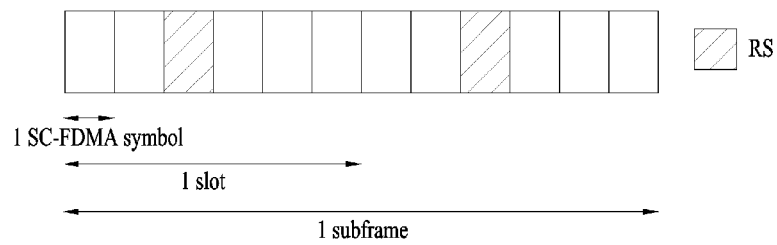
1 SC-FDMA symbol
1 slot
1 subframe
(b)

METHOD AND APPARATUS FOR TRANSMITTING REFERENCE SIGNAL IN MULTIPLE ANTENNA SUPPORTING WIRELESS COMMUNICATION SYSTEM

CROSS-REFERENCE TO RELATED APPLICATIONS

This application is the National Stage filing under 35 U.S.C. 371 of International Application No. PCT/KR2014/008378, filed on Sep. 5, 2014, which claims the benefit of U.S. Provisional Application No. 61/874,342, filed on Sep. 5, 2013, the contents of which are all hereby incorporated by reference herein in their entirety.

TECHNICAL FIELD

The present invention relates to a wireless communication system, and more particularly, to a method and apparatus for transmitting a reference signal in a wireless communication system supporting multiple antennas.

BACKGROUND ART

MIMO (multi-input multi-output) technology means a method of improving data transceiving efficiency by adopting multiple transmitting antennas and multiple receiving antennas instead of a single transmitting antenna and a single receiving antenna. In particular, this technology increases capacity or enhances performance using multiple antennas in a transmitting or receiving end of a wireless communication system. This MIMO technology may be called multi-antenna technology.

In order to support MIMO transmission, it may be able to use a precoding matrix to appropriately distribute transmission information to each antenna in accordance with a channel status and the like. In the conventional 3GPP (3rd generation partnership project) LTE (long term evolution) system, maximum 4 transmitting antennas are supported for downlink transmission and a corresponding precoding codebook is defined.

DISCLOSURE OF THE INVENTION

Technical Task

Based on the above-described discussion, a method and apparatus for transmitting a reference signal in a wireless communication system supporting multiple antennas will hereinafter be proposed.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of transmitting a reference signal by a transmitting end in a wireless communication system supporting multiple antennas, including the steps of forming a $1^{st}$ antenna group on the basis of a plurality of antenna elements including horizontal domain antenna elements and vertical domain antenna elements, transmitting a configuration for a specific subframe to $1^{st}$ user equipments through the $1^{st}$ antenna group, receiving an SRS (sounding reference signal) through the specific subframe from the $1^{st}$ user equipments, selecting at least one $2^{nd}$ user equipment from the $1^{st}$ user equipments on the basis of the SRS, and transmitting a CSI-RS (channel state information-reference signal) to the at least one $2^{nd}$ user equipment, wherein at least a portion of a resource region in the specific subframe is configured as an MBSFN (multicast broadcast single frequency network) subframe.

Preferably, the SRS may be transmitted through a specific resource region, which is configured as the MBSFN subframe, in the specific subframe. More preferably, the specific resource region may correspond to a specific frequency band and may be configured different for each of the $1^{st}$ user equipments. Moreover, the specific resource region may include at least one symbol having an index greater than a pre-defined symbol index. Furthermore, the specific resource region may be configured through high layer signaling.

Preferably, the at least one $2^{nd}$ user equipment may be selected from the $1^{st}$ user equipments with reference to a beam direction measured based on the SRS.

Preferably, the configuration for the specific subframe may be announced to at least one neighbor cell.

Preferably, if the SRS and a periodic uplink signal are simultaneously transmitted in the specific subframe, while a sum of transmission power for the SRS and transmission power for the periodic uplink signal exceeds maximum power configured for the specific subframe, the transmission power for the periodic uplink signal may be reduced.

Preferably, if the SRS and a periodic uplink signal are not simultaneously transmitted in the specific subframe, the periodic uplink signal configured in the specific subframe may be dropped.

Preferably, if the SRS and an aperiodic uplink signal are simultaneously transmitted in the specific subframe, while a sum of transmission power for the SRS and transmission power for the aperiodic uplink signal exceeds maximum power configured for the specific subframe, the transmission power for the SRS may be reduced.

Preferably, if the SRS and an aperiodic uplink signal are not simultaneously transmitted in the specific subframe, the SRS configured in the specific subframe may be dropped.

Preferably, the SRS may be transmitted by applying uplink timing alignment.

Preferably, the SRS may be transmitted according to power control of an uplink SRS.

In a $2^{nd}$ technical aspect of the present invention, provided herein is a base station configured to transmit a reference signal in a wireless communication system supporting multiple antennas, including a radio frequency unit and a processor, wherein the processor is configured to form a $1^{st}$ antenna group on the basis of a plurality of antenna elements including horizontal domain antenna elements and vertical domain antenna elements, to transmit a configuration for a specific subframe to $1^{st}$ user equipments through the $1^{st}$ antenna group, to receive an SRS (sounding reference signal) through the specific subframe from the $1^{st}$ user equipments, to select at least one $2^{nd}$ user equipment from the $1^{st}$ user equipments on the basis of the SRS, and to transmit a CSI-RS (channel state information-reference signal) to the at least one $2^{nd}$ user equipment and wherein at least a portion of a resource region in the specific subframe is configured as an MBSFN (multicast broadcast single frequency network) subframe.

Advantageous Effects

According to an embodiment of the present invention, a reference signal can be efficiently transmitted in a wireless communication system supporting multiple antennas.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 13 is a diagram to describe a scheme of mapping a DFT-processed signal into a frequency domain.

FIG. 15 is a diagram for a location of a symbol to which a reference signal is mapped.

BEST MODE FOR INVENTION

Figure 1:
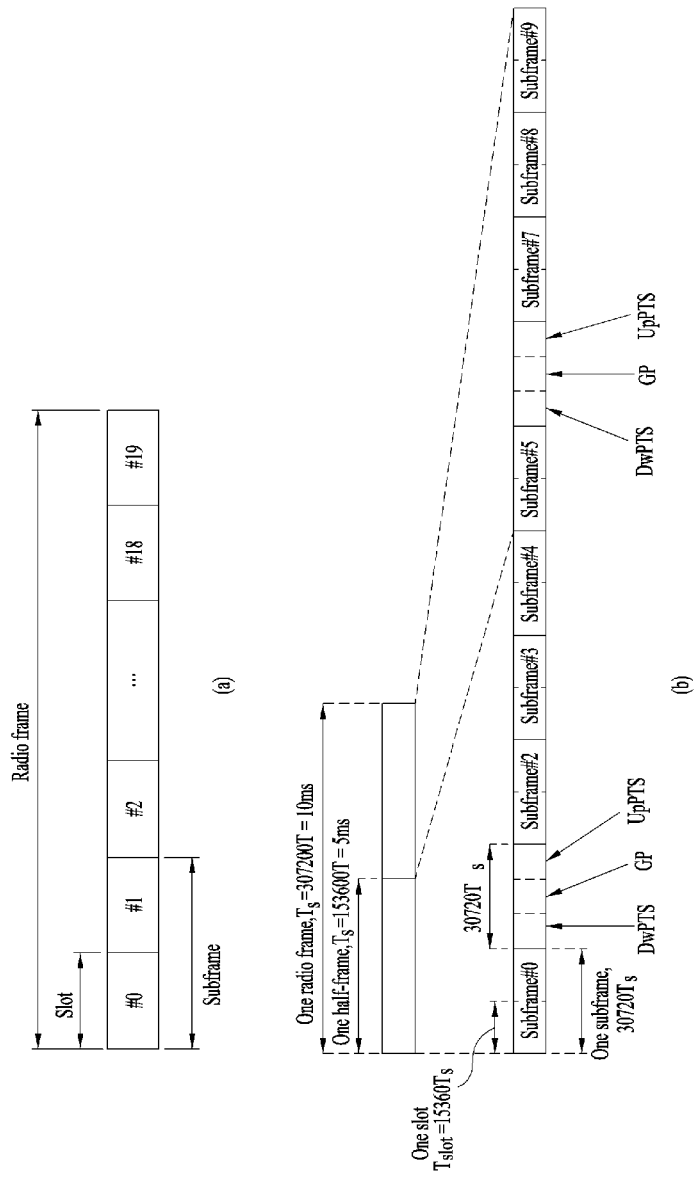
FIG. 1 is a diagram to describe a structure of a downlink radio frame.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. Moreover, in this specification, a terminology called a base station may be conceptionally used as including a cell or a sector. Meanwhile, a relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like. In this specification, an uplink transmission entity may mean a terminal or a relay. And, an uplink reception entity may mean a base station or a relay. Similarly, a downlink transmission entity may mean a base station or a relay. And, a downlink reception entity may mean a terminal or a relay. So to speak, an uplink transmission may mean a transmission from a terminal to a base station, a transmission from a terminal to a relay, or a transmission from a relay to a base station. Similarly, a downlink transmission may mean a transmission from a base station to a terminal, a transmission from a base station to a relay, or a transmission from a relay to a terminal.

Specific terminologies used for the following description may be provided to help the understanding of the present invention. And, the use of the specific terminology may be modified into other forms within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

A structure of a downlink (DL) radio frame is described with reference to FIG. 1 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 1 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multipath delay of a downlink signal between uplink and downlink. Meanwhile, 1 subframe is constructed with 2 slots irrespective of a type of a radio frame.

The above-described structures of the radio frame are just exemplary. And, the number of subframes included in a radio frame, the number of slots included in the subframe and the number of symbols included in the slot may be modified in various ways.

Figure 2:
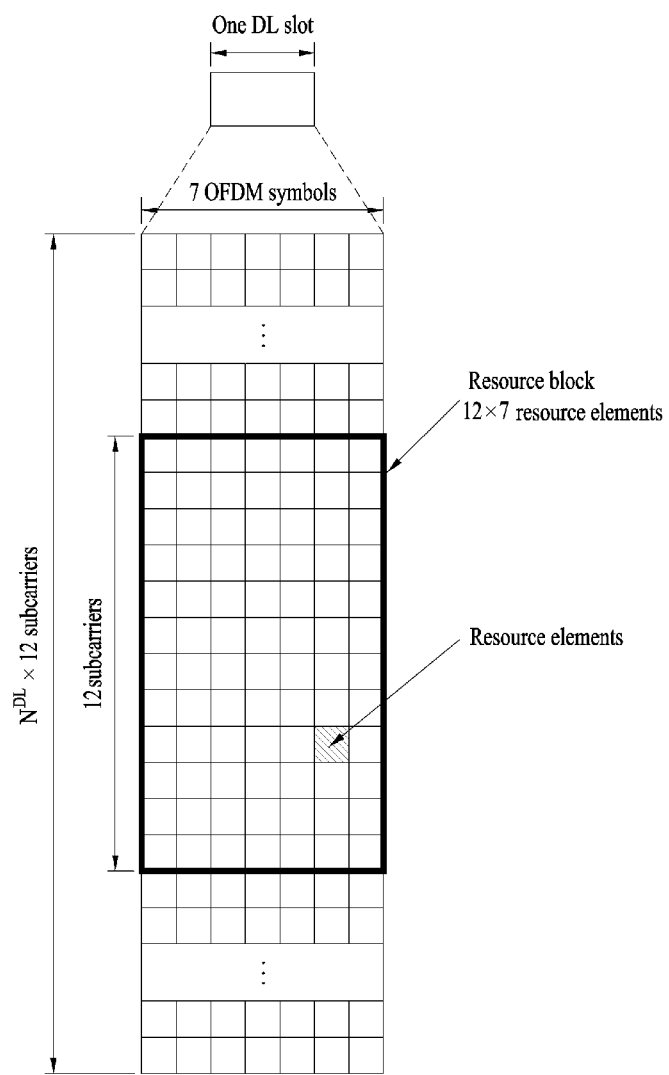
FIG. 2 is a diagram for one example of a resource grid for one downlink slot.

FIG. 2 is a diagram for one example of a resource grid for a downlink (DL) slot. This corresponds to a case that OFDM symbol includes a normal CP. Referring to FIG. 2, a downlink slot includes a plurality of OFDM symbols in time domain and includes a plurality of resource blocks in frequency domain. In this case, for example, a single downlink slot includes 7 OFDM symbols and a single resource block includes 12 subcarriers, by which configurations of the downlink slot and the resource block are non-limited. Each element on a resource grid is called a resource element (RE). for instance, a resource element a (k, l) becomes a resource element located at $k^{th}$ subcarrier and $l^{th}$ OFDM symbol. In case of a normal CP, a single resource block includes 12×7 resource elements [in case of an extended CP, 12×6 resource elements are included]. Since an interval of each subcarrier is 15 kHz, a single resource block includes about 180 kHz in frequency domain. $N^{DL}$ indicates the number of resource blocks included in a downlink slot. And, the value of $N^{DL}$ may be determined depending on a downlink transmission bandwidth set up by scheduling of a base station.

Figure 3:
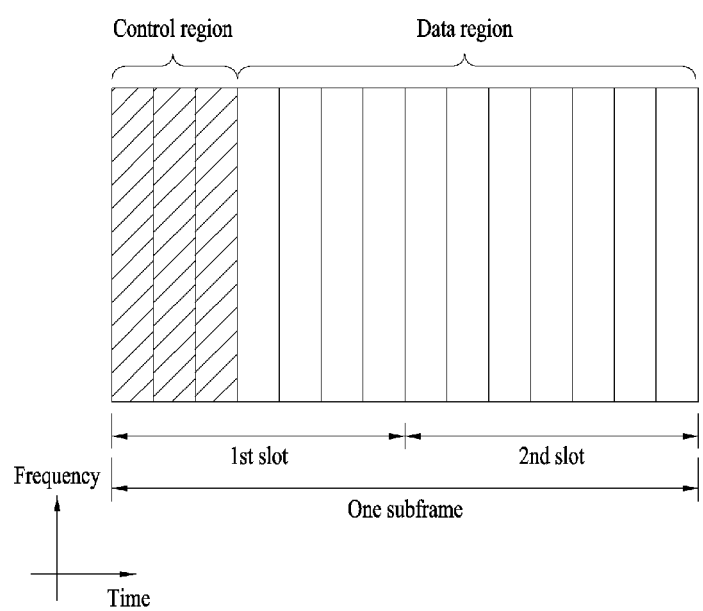
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment)

group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 4:
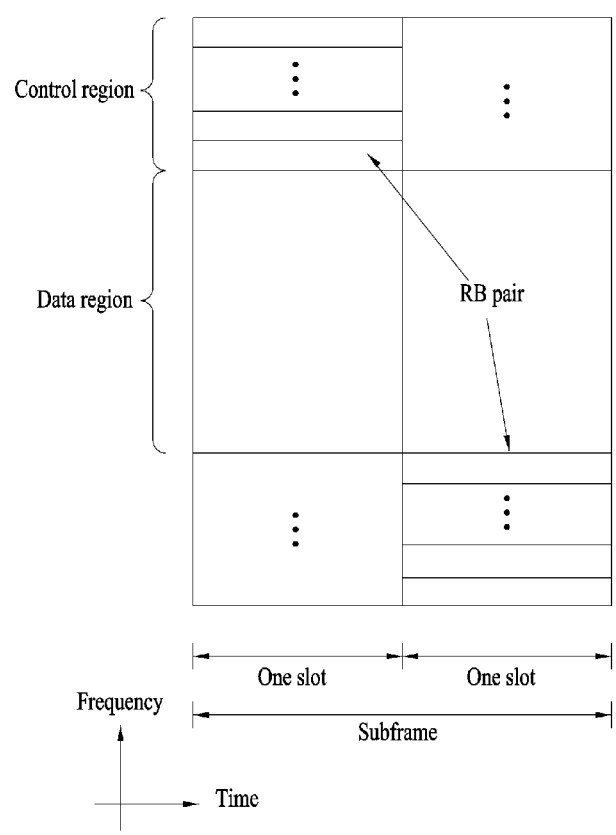
FIG. 4 is a diagram for a structure of an uplink subframe.

FIG. 4 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Reference Signal

In MIMO system, each transmitting antenna has an independent data channel. A transmitting antenna may mean a virtual antenna or a physical antenna. A receiver receives data transmitted from each transmitting antenna in a manner of estimating a channel for the corresponding transmitting antenna. Channel estimation means a process for reconstructing a received signal by compensating for distortion of a signal caused by fading. In this case, the fading indicates an effect that strength of a signal rapidly fluctuates due to multipath-time delay in a wireless communication system environment. For the channel estimation, a reference signal known to both a transmitter and a receiver is necessary. The reference signal may be simply named RS or a pilot in accordance with an applicable standard.

In the legacy 3GPP LTE Release-8 or -9 system, a downlink reference signal transmitted by a base station is defined. Downlink reference signal is a pilot signal for coherent demodulation of such a channel as PDSCH (Physical Downlink Shared CHannel), PCFICH (Physical Control Format Indicator CHannel), PHICH (Physical Hybrid Indicator CHannel), PDCCH (Physical Downlink Control CHannel) and the like. The downlink reference signal may be categorized into a common reference signal (CRS) shared by all user equipments in a cell and a dedicated reference signal (DRS) for a specific user equipment only. The common reference signal may be called a cell-specific reference signal. And, the dedicated reference signal may be called a user equipment-specific (UE-specific) reference signal or a demodulation reference signal (DMRS).

Downlink reference signal assignment in the legacy 3GPP LTE system is described as follows. First of all, a position (i.e., a reference signal pattern) of a resource element for carrying a reference signal is described with reference to one resource block pair (i.e., 'one subframe length in time domain'×'12-subcarrier length in frequency domain'). A single subframe is configured with 14 OFDM symbols (in case of a normal CP) or 12 OFDM symbols (in case of an extended CP). The number of subcarriers in a single OFDM symbol is set to one of 128, 256, 512, 1024, 1536 and 2048 to use.

Figure 5:
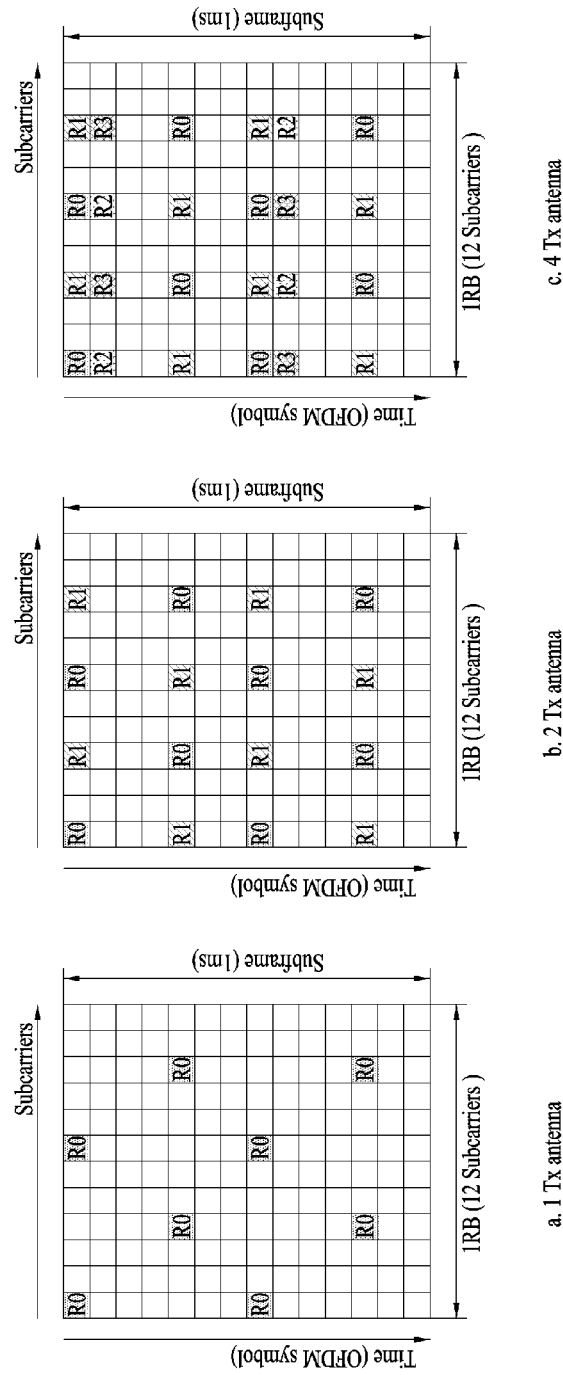
FIG. 5 is a diagram for a pattern of a common reference signal (CRS).

FIG. 5 shows a pattern of a common reference signal (CRS) in case that 1-TTI (i.e., 1 subframe) has 14 OFDM symbols. FIG. 5 (a), FIG. 5 (b) and FIG. 5 (c) relates to a CRS pattern for a system having 1 Tx (transmitting) antenna, a CRS pattern for a system having 2 Tx antennas and a CRS pattern for a system having 4 Tx antennas, respectively.

In FIG. 5, R0 indicates a reference signal for an antenna port index 0. In FIG. 5, R1 indicates a reference signal for an antenna port index 1, R2 indicates a reference signal for an antenna port index 2, and R3 indicates a reference signal for an antenna port index 3. Regarding a position of an RE for carrying a reference signal for each of the antenna ports, no signal is transmitted from the rest of all antenna ports except the antenna port for transmitting a reference signal to prevent interference.

Figure 6:
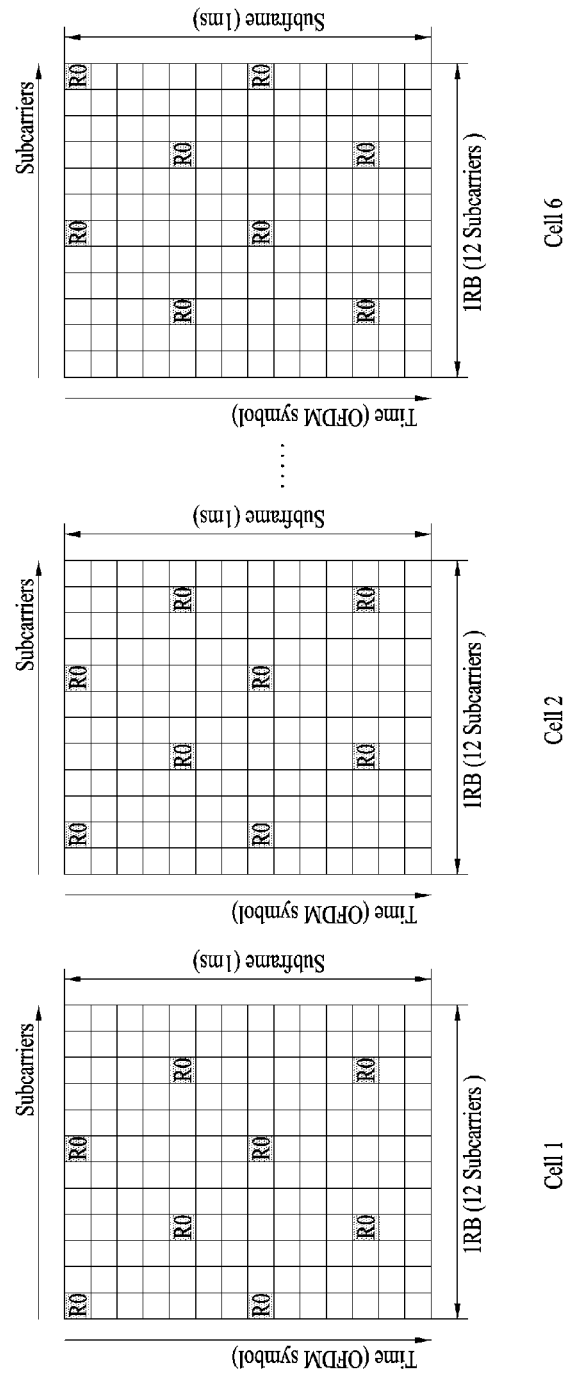
FIG. 6 is a diagram to describe a shift of a reference signal pattern.

FIG. 6 shows that a reference signal pattern is shifted in each cell to prevent reference signals of various cells from colliding with each other. Assuming that a reference signal pattern for one antenna port shown in FIG. 5 (a) is used by a cell #1 (Cell 1) shown in FIG. 6, in order to prevent collision of reference signals between cells including a cell #2 adjacent to the cell #1, a cell #3 adjacent to the cell #1 and the like, it is able to protect a reference signal in a manner of shifting a reference signal pattern by subcarrier or OFDM symbol unit in frequency or time domain. For instance, in case of 1 Tx antenna transmission, since a reference signal is situated in 6-subcarrier interval on a single OFDM symbol, if a shift by subcarrier unit in frequency domain is applied to each cell, at least 5 adjacent cells may be able to situate reference signals on different resource elements, respectively. For instance, a frequency shift of a reference signal may be represented as the cell #2 and the cell #6 in FIG. 6.

Moreover, by multiplying a downlink reference signal per cell by a pseudo-random (PN) sequence and then transmitting the multiplied signal, interference caused to a receiver by a reference signal received from an adjacent cell can be reduced to enhance channel estimation performance. This PN sequence may be applicable by OFDM symbol unit in a single subframe. Regarding the PN sequence, a different sequence may be applicable per cell ID, subframe number or OFDM symbol position.

In a system [e.g., 8-Tx antenna supportive wireless communication system (e.g., 3GPP LTE Release-10 system, a systems according to 3GPP LTE Releases next to Release-10, etc.)] having antenna configuration more extended than a legacy 4-Tx antenna supportive communication system (e.g., 3GPP LTE Release-8 system, 3GPP LTE Release-9 system, etc.), DMRS based data demodulation is taken into consideration to support efficient management & operation and developed transmission scheme of reference signals. In particular, in order to support data transmission via extended antennas, it may be able to define DMRS for at least two layers. Since DMRS is precoded by the same precoder of data, it is easy for a receiving side to estimate channel information for demodulating data without separate precoding information. Meanwhile, a downlink receiving side is able to acquire channel information precoded for the extended antenna configuration through DMRS. Yet, a separate reference signal other than the DMRS is requested to acquire non-precoded channel information. Hence, in a system by LTE-A standards, a reference signal (i.e., CSI-RS) for a receiving side to acquire channel state information (CSI) can be defined. In particular, CSI-RS may be transmitted via 8 antenna ports. In order to discriminate a CSI-RS transmitted antenna port from an antenna port of 3GPP LTE Release-8/9, it may be able to use antenna port indexes 15 to 22.

Configuration of Downlink Control Channel

As a region for transmitting a downlink control channel, first three OFDM symbols of each subframe are available. In particular, 1 to 3 OFDM symbols are available in accordance with overhead of the downlink control channel. In order to adjust the number of OFDM symbols for a downlink control channel in each subframe, it may be able to use PCFICH. And, it is able to use PHICH to provide an acknowledgment response [ACK/NACK (acknowledgement/negative-acknowledgement)] to an uplink transmission in downlink. Moreover, it is able to use PDCCH to transmit control information for a downlink or uplink data transmission.

Figure 7:
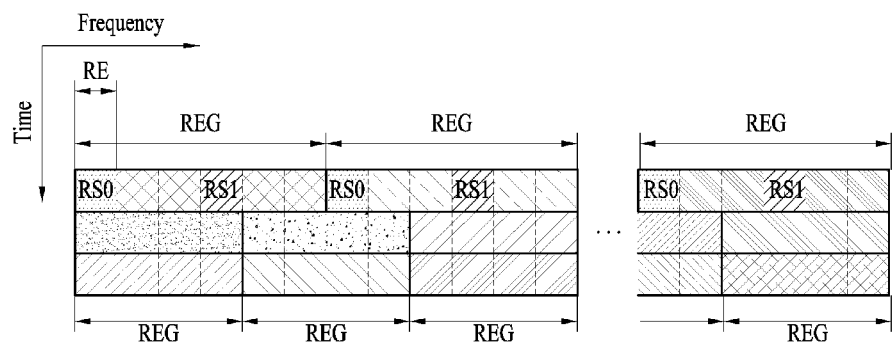
FIG. 7 and FIG. 8 are diagrams to describe a resource element group (REG) corresponding to a unit to which downlink control channels are assigned.
Figure 8:
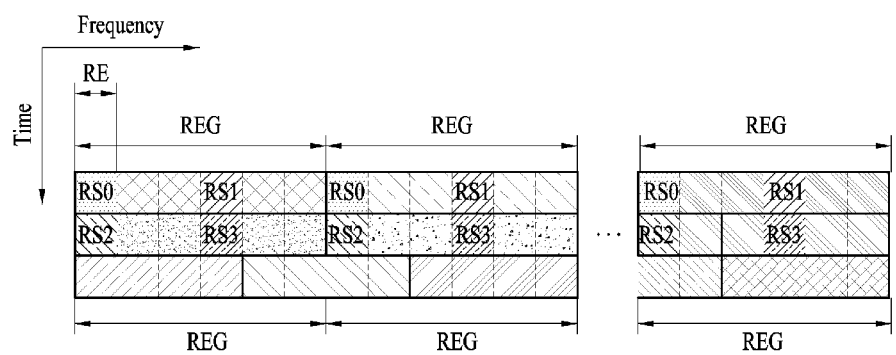

FIG. 7 and FIG. 8 show that the above-configured downlink control channels are assigned by resource element group (REG) unit in a control region of each subframe. FIG. 7 relates to a system having 1- or 2-Tx antenna configuration and FIG. 8 relates to a system having 4-Tx antenna configuration. Referring to FIG. 7 and FIG. 8, REG corresponding to a basic resource unit for assigning a control channel is configured with 4 contiguous Res in frequency domain except a resource element for assigning a reference signal. A specific number of REGs are available for a transmission of a downlink control channel in accordance with overhead of the downlink control channel.

PCFICH (Physical Control Format Indicator Channel)

In order to provide every subframe with resource allocation information of the corresponding subframe and the like, it is able to transmit PDCCH between OFDM symbol indexes 0 to 2. In accordance with overhead of a control channel, it may be able to use the OFDM symbol index 0, the OFDM symbol indexes 0 and 1, or the OFDM symbol indexes 0 to 2. Thus, the number of OPFDM symbols used for a control channel is changeable for each subframe. And, information on the OFDM symbol number may be provided via PCFICH. Hence, the PCFICH should be transmitted in every subframe.

Three kinds of informations can be provided through the PCFICH. Table 1 in the following shows CFI (control format indicator) of PCFICH. 'CFI=1' indicates that PDCCH is transmitted on OFDM symbol index 0, 'CFI=2' indicates that PDCCH is transmitted on OFDM symbol indexes 0 and 1, and 'CFI=3' indicates that PDCCH is transmitted on OFDM symbol indexes 0 to 2.

TABLE 1

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information carried on PCFICH may be defined different in accordance with a system bandwidth. For instance, in case that a bandwidth of a system is smaller than a specific threshold, 'CFI=1' may indicate that 2 OFDM symbols are used for PDCCH. 'CFI=2' may indicate that 3 OFDM symbols are used for PDCCH. And, 'CFI=3' may indicate that 4 OFDM symbols are used for PDCCH.

Figure 9:
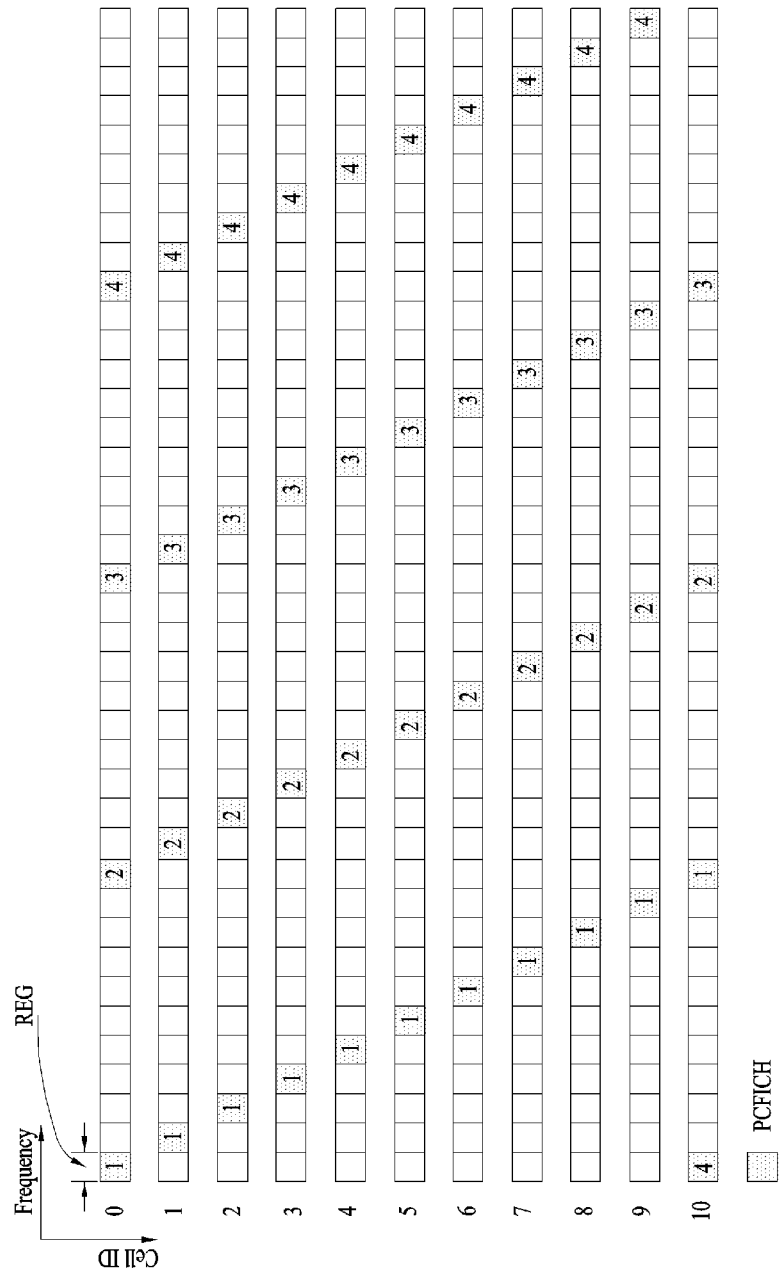
FIG. 9 is a diagram to illustrate a scheme of transmitting PCFICH.

FIG. 9 is a diagram for a scheme of transmitting PCIFCH. REG shown in FIG. 9 is configured with 4 subcarriers, and more particularly, with data subcarriers except RS (reference signal). Generally, a transmit diversity scheme may apply thereto. A position of the REG may be frequency-shifted per cell (i.e., in accordance with a cell identifier) not to cause interference between cells. Additionally, PCFICH is always transmitted on a $1^{st}$ OFDM symbol (i.e., OFDM symbol index 0) of a subframe. Hence, when a receiving end receives a subframe, the receiving end acquires the number of OFDM symbols for carrying PDCCH by checking information of PCFICH and is then able to receive control information transmitted on the PDCCH.

PHICH (Physical Hybrid-ARQ Indicator Channel)

Figure 10:
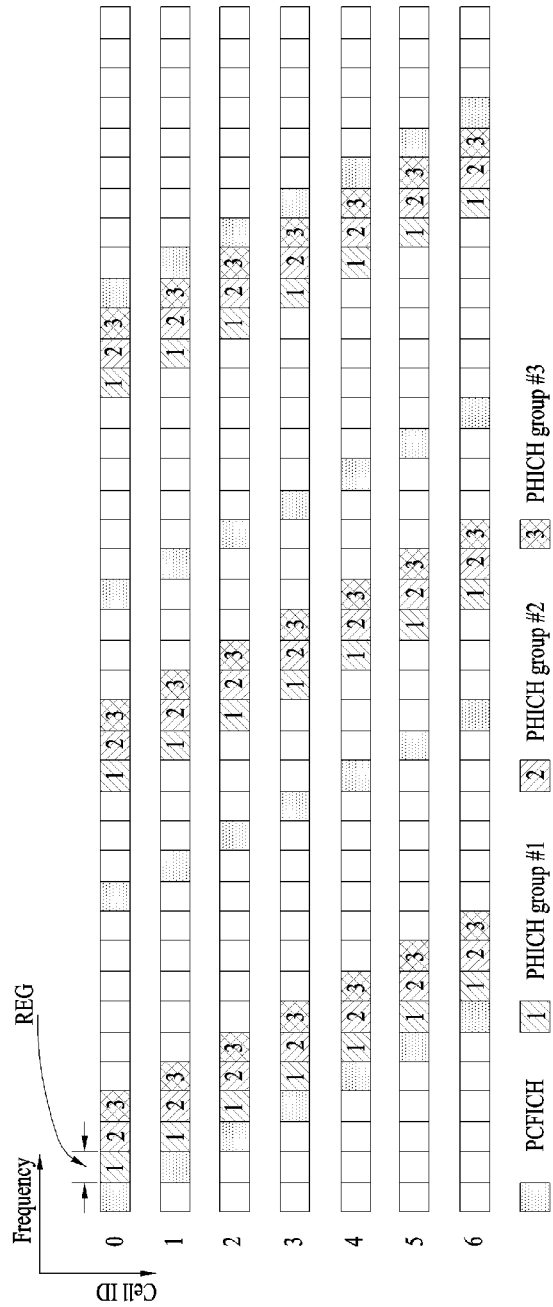
FIG. 10 is a diagram for locations of PCFICH and PHICH.

FIG. 10 is a diagram to illustrate positions of PCFICH and PHICH generally applied for a specific bandwidth. ACK/NACK information on an uplink data transmission is transmitted on PHICH. Several PHICH groups are created in a single subframe and several PHICHs exist in a single PHICH group. Hence, PHICH channels for several user equipments are included in the single PHICH group.

Referring to FIG. 10, PHICH assignment for each user equipment in several PHICH groups are performed using a lowest PRB (physical resource block) index of PUSCH resource allocation and a cyclic shift index for a demodulation reference signal (DMRS) transmitted on a UL (uplink) grant PDCCH. In this case, the DMRS is a UL reference signal and is the signal provided together with a UL transmission for channel estimation for demodulation of UL data. Moreover, PHICH resource is known through such an index pair as $(n_{PHICH}^{group}, n_{PHICH}^{seq})$. In $(n_{PHICH}^{group}, n_{PHICH}^{seq})$, $n_{PHICH}^{group}$ means a PHICH group number) and $n_{PHICH}^{seq}$ means an orthogonal sequence index in the corresponding PHICH group. $n_{PHICH}^{group}$ and $n_{PHICH}^{seq}$ is defined as Formula 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH}$$

[Formula 1]

In Formula 1, $n_{DMRS}$ indicates a cyclic shift of DMRS used for a PHICH associated UL transmission. And, $N_{SF}^{PHICH}$ indicates a spreading factor size used for PHICH. $I_{PRB\_RA}^{lowest\_index}$ indicates a lowest PRB index of a UL resource allocation. $N_{PHICH}^{group}$ indicates the number of the configured PHICH groups and may be defined as Formula 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Formula 2]}$$

In Formula 2, $N_g$ indicates an amount of PHICH resource transmitted on PBCH (Physical Broadcast Channel) and $N_g$ is represented as $N_g \in \{1/6, 1/2, 1, 2\}$ in 2-bit size.

One example of an orthogonal sequence defined by the legacy 3GPP LTE Release-8/9 is shown in Table 2.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 11:
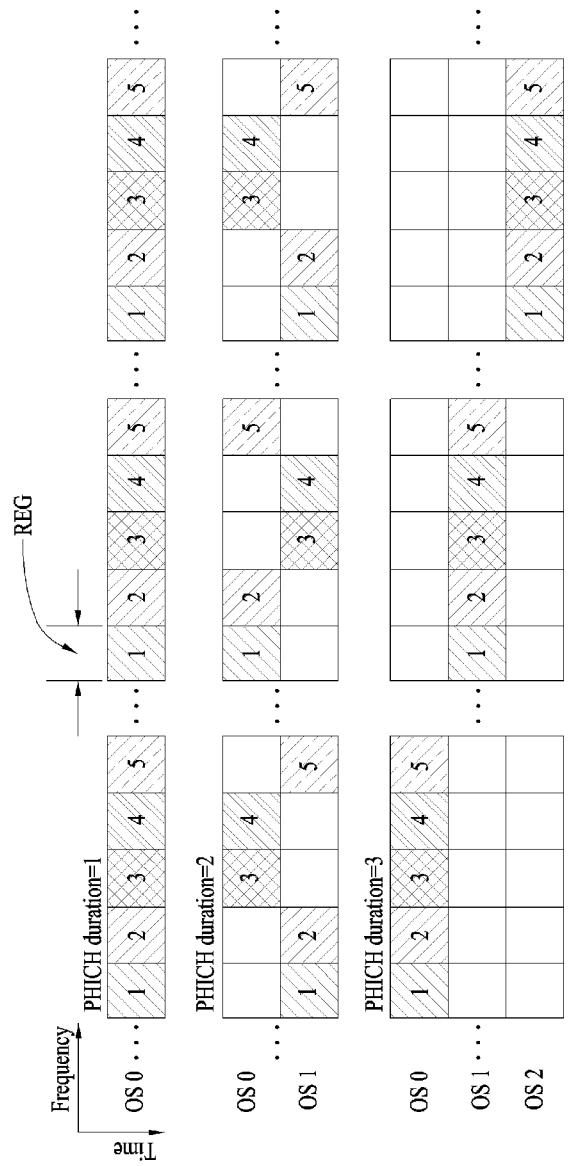
FIG. 11 is a diagram for a location of a downlink resource element to which a PHICH group is mapped.

FIG. 11 is a diagram to illustrate a position of a downlink (DL) resource element having PHICH group mapped thereto. Referring to FIG. 11, PHICH group may be configured in different time region (i.e., a different OS (OFDM symbol)) within a single subframe.

PDCCH (Physical Downlink Control Channel)

Control information transmitted on PDCCH may have control information size and usage differing in accordance with a DCI (downlink control information) format. And, a size of the PDCCH may vary in accordance with a coding rate. For instance, DCI formats used by the legacy 3GPP LTE Release-8/9 may be defined as Table 3.

TABLE 3

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |

The DCI format shown in Table 3 is independently applied per user equipment and PDCCHs of several user equipments can be simultaneously multiplexed within a single subframe. The multiplexed PDCCH of each of the user equipments is independently channel-coded and CRC is applied thereto. The CRC of the PDCCH is masked with a unique identifier of each of the user equipments and can be applied to enable the corresponding user equipment to receive the PDCCH of its own. Yet, since a user equipment is basically unable to know a position of its PDCCH channel, the user equipment checks whether each of the entire PDCCH channels of the corresponding DCI format matches the PDCCH channel having the ID of the corresponding user equipment for each subframe and needs to perform blind detection until receiving the corresponding PDCCH. A basic resource allocation unit of the PDCCH is CCE (control channel element) and a single CCE is configured with 9 TEGs. A single PDCCH may be configured with 1, 2, 4 or 8 CCEs. PDCCH configured in accordance with each user equipment is interleaved into a control channel region of each subframe and then mapped by a CCE-to-RE mapping rule. This may vary an RE position having a CCE mapped thereto in accordance with the OFDM symbol number for a control channel of each subframe, the PHICH group number, Tx antennas, a frequency shift and the like.

Uplink Retransmission

Uplink (UL) retransmission may be indicated via the aforementioned PHICH and the DCI format 0 (i.e., DCI format for scheduling PUSCH transmission). A user equipment receives ACK/NACK for a previous UL transmission via PHICH and is then able to perform a synchronous non-adaptive retransmission. Alternatively, a user equipment receives a UL grant via DCI format 0 PDCCH from a base station and is then able to perform a synchronous adaptive retransmission.

The synchronous transmission means that a retransmission is performed at a predetermined timing point (e.g., $(n+k)^{th}$ subframe) after a timing point (e.g., $n^{th}$ subframe) of transmitting a data packet. In both cases of the retransmission by PHICH and the retransmission by UL grant PDCCH, the synchronous retransmission is performed.

Regarding the non-adaptive retransmission of performing a retransmission on PHICH, the same frequency resource and transmitting method of the former frequency resource (e.g., physical resource block (PRB) region) and transmitting method (e.g., modulation scheme, etc.) used for a previous transmission are applied to the retransmission. Meanwhile, regarding the adaptive retransmission of performing a retransmission via UL grant PDCCH, a frequency resource and transmitting method for performing a retransmission may be set different from those of a previous transmission in accordance with a scheduling control information indicated by a UL grant.

In case that a user equipment receives a UL grant PDCCH as soon as receives PHICH, the user equipment may be able to perform a UL transmission in accordance with control information of the UL grant PDCCH by ignoring the PHICH. Since a new data indicator (NDI) is included in the UL grant PDCCH (e.g., DCI format 0), if NDI bit is toggled more than a previously provided NDI value, the user equipment regards a previous transmission as successful and is then able to transmit new data. Meanwhile, although the user equipment receives ACK for a previous transmission via PHICH, unless the NDI value is toggled in the UL grant PDCCH received simultaneously with or after the PHICH reception, the user equipment is configured not to flush a buffer for the previous transmission.

Uplink Transmission Configuration

Figure 12:
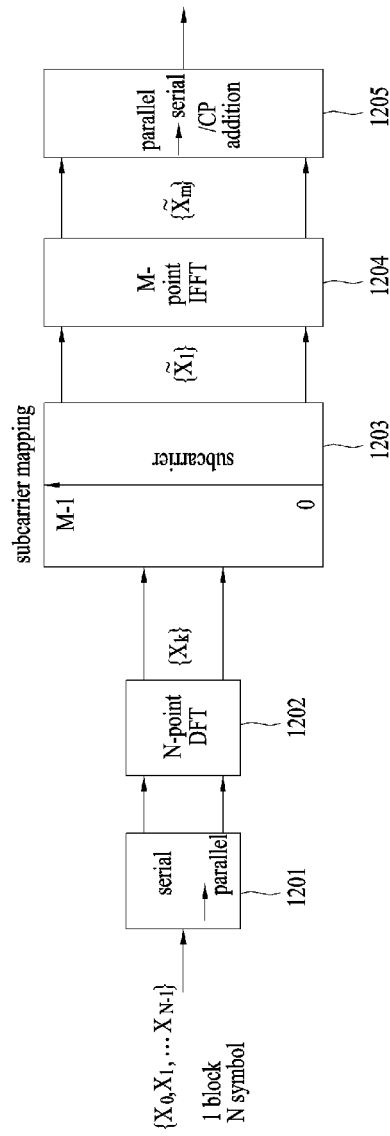
FIG. 12 is a diagram for a structure of a transmitter according to an SC-FDMA scheme

FIG. 12 is a diagram for a structure of a transmitter by SC-FDMA.

First of all, a single block configured with N symbols inputted to a transmitter is converted to a parallel signal via a serial-to-parallel converter 1201. The parallel signal spreads via an N-point DFT module 1202. The spreading signal is mapped to a frequency region via a subcarrier mapping module 1203. Signals on subcarriers configure linear combination of N symbols. The signal mapped to the frequency region is transformed into a time-domain signal via an M-point IFFT module 1204. The time-domain signal is converted to a parallel signal via a parallel-to-serial converter 1205 and then has a CP added thereto. The effect of the IFFT processing by the M-point IFFT module 1204 is cancelled out by the DFT processing of the N-point DFT module 1202 to some extent. In this point, the SC-FDMA may be named DFT-s-OFDMA (DFT-spread-OFDMA). Moreover, although the signal inputted to the DFT module 1202 has a low PAPR (peak-to-average power ratio) or CM (cubic metric), it may have a high PAPR after DFT processing. And, the signal outputted by the IFFT processing of the IFFT module 1204 may have a low PAPR again. In particular, according to the SC-FDMA, transmission is performed by avoiding a non-linear distortion interval of a power amplifier (PA), whereby a cost for implementation of a transmitting end can be reduced.

FIG. 13 is a diagram to describe a scheme of mapping a signal outputted from the DFT module 1202 to a frequency region. By performing one of the two schemes shown in FIG. 13, a signal outputted from an SC-FDMA transmitter can meet the single carrier property. FIG. 13 (*a*) shows a localized mapping scheme of locally mapping signals outputted from the DFT module 1202 to a specific part of a subcarrier region. FIG. 13 (*b*) shows a distributed mapping scheme of mapping signals outputted from the DFT module 1202 to a whole subcarrier region by being distributed. In the legacy 3GPP LTE Release-8/9 system, it is defined that the localized mapping scheme is used.

Figure 14:
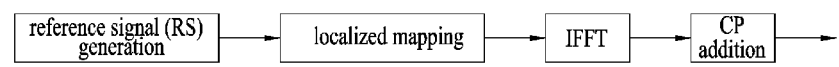
FIG. 14 is a block diagram to describe a process for reference signal transmission.

FIG. 14 is a block diagram to describe a transmission processing of a reference signal to demodulate a transmitted signal by SC-FDMA. In the legacy 3GPP LTE Release-8/9 system, a data part is transmitted in a manner of transforming a signal generated from a time domain into a frequency-domain signal by DFT processing, performing subcarrier mapping on the frequency-domain signal, and then performing IFFT processing on the mapped signal [cf. FIG. 12]. Yet, a reference signal (RS) is defined as directly generated in frequency domain without DFT processing, mapped to subcarrier, undergoing IFFT processing, and then having CP addition thereto.

FIG. 15 is a diagram to illustrate a symbol position having a reference signal (RS) mapped thereto in a subframe structure according to SC-FDMA. FIG. 15 (*a*) shows that RS is located at $4^{th}$ SC-FDMA symbol of each of 2 slots in a single subframe in case of a normal CP. FIG. 15 (*b*) shows that RS is located at $3^{rd}$ SC-FDMA symbol of each of 2 slots in a single subframe in case of an extended CP.

Clustered DFT-s-OFDMA scheme is described with reference to FIGS. 16 to 19 as follows. The clustered DFT-s-OFDMA is the modification of the aforementioned SC-FDMA. According to the clustered DFT-s-OFDMA, a DFT-processed signal is segmented into a plurality of sub-blocks and then mapped to a spaced position in frequency domain.

Figure 16:
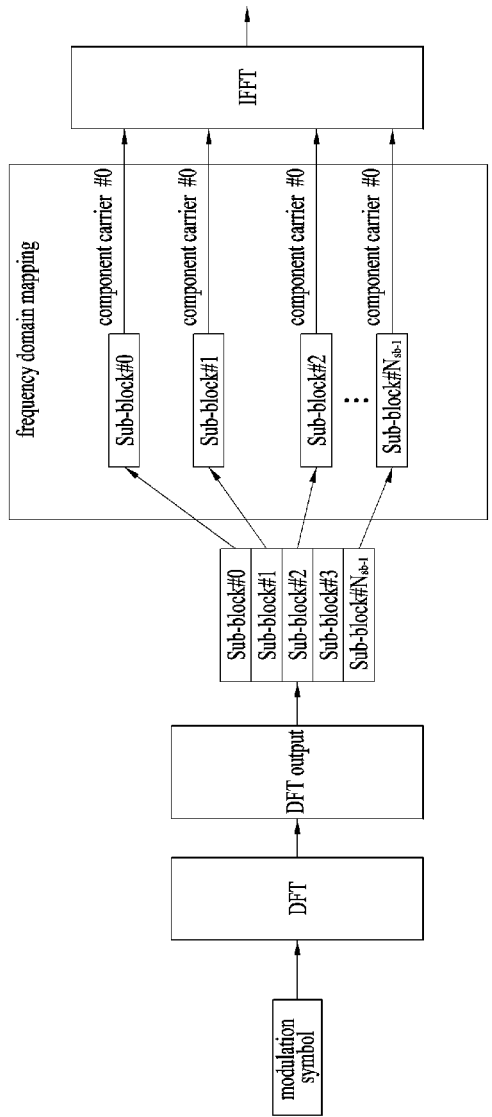
FIGS. 16 to 19 are diagrams to describe a clustered DFT-s-OFDMA scheme.

FIG. 16 is a diagram to describe a clustered DFT-s-OFDMA scheme on a single carrier. For instance, a DFT output may be partitioned into Nsb sub-blocks (sub-blocks #0 to #Nsb−1). When sub-blocks are mapped to a frequency region, the sub-blocks #0 to #Nsb−1 are mapped to a single carrier (e.g., carrier of 20 MHz bandwidth, etc.) and each of the sub-blocks may be mapped to a position spaced in the frequency region. And, each of the sub-blocks may be locally mapped to the frequency region.

Figure 17:
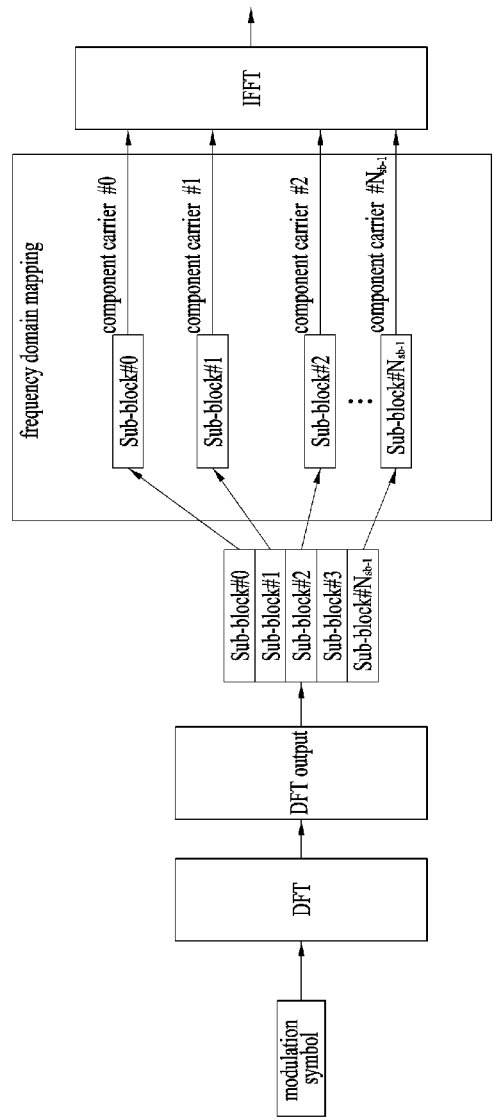
Figure 18:
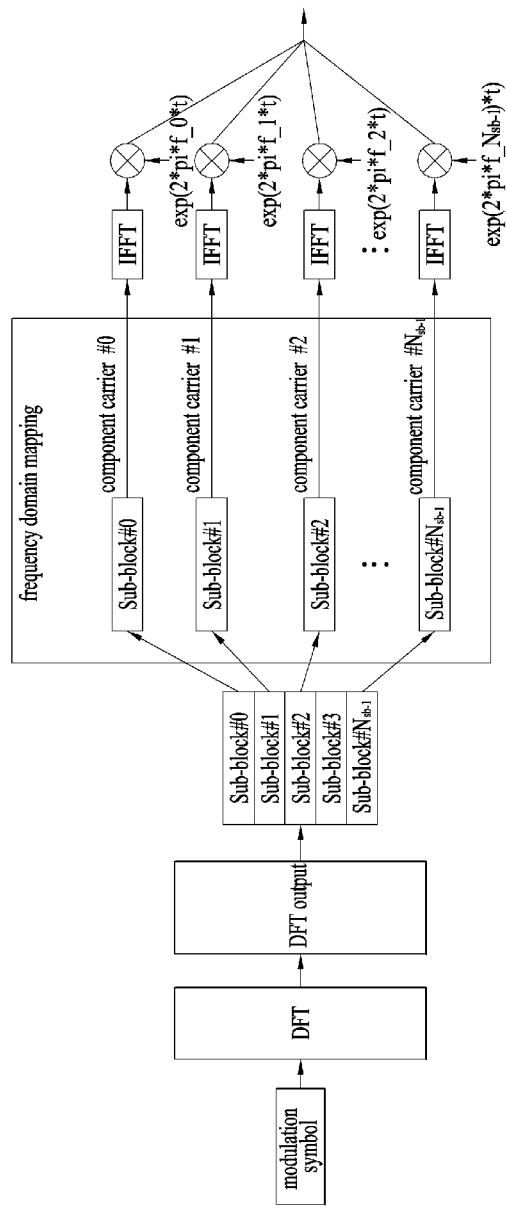

FIG. 17 and FIG. 18 are diagrams to describe a clustered DFT-s-OFDMA scheme on multiple carriers.

In a situation (i.e., frequency bands of multiple carriers (cells) are contiguously assigned) that multiple carriers (or multiple cells) are configured contiguously, if a subcarrier interval between contiguous carriers is aligned, FIG. 17 is a diagram for one example that a signal can be generated through a single IFFT module. For instance, a DFT output may be segmented into Nsb sub-blocks (sub-blocks #0 to #NSb−1). In mapping sub-blocks to a frequency region, the sub-blocks #0 to #NSb−1 can be mapped to component carriers #0 to #NSb−1, respectively [e.g., each carrier (or cell) may have a bandwidth of 20 MHz]. moreover, each of the sub-blocks may be mapped to a frequency region by being localized. And, the sub-blocks mapped to the carriers (or cells) may be transformed into a time-domain signal through a single IFFT module.

In a situation (i.e., frequency bands of multiple carriers (cells) are non-contiguously assigned) that multiple carriers (or multiple cells) are configured non-contiguously, FIG. 18 is a diagram for one example that a signal is generated using a plurality of IFFT modules. For instance, a DFT output may be segmented into Nsb sub-blocks (sub-blocks #0 to #NSb−1). In mapping sub-blocks to a frequency region, the sub-blocks #0 to #NSb−1 can be mapped to carriers #0 to #NSb−1, respectively [e.g., each carrier (or cell) may have a bandwidth of 20 MHz]. moreover, each of the sub-blocks may be mapped to a frequency region by being localized. And, the sub-blocks mapped to the carriers (or cells) may be transformed into a time-domain signal through the IFFT modules, respectively.

If the clustered DFT-s-OFDMA on the single carrier mentioned with reference to FIG. 16 is called intra-carrier (or intra-cell) DFT-s-OFDMA, the DFT-s-OFDMA on the multiple carriers (or cells) mentioned with reference to FIG. 17 or FIG. 18 may be called inter-carrier (or inter-cell) DFT-s-OFDMA. Thus, the intra-carrier DFT-s-OFDMA and the inter-carrier DFT-s-OFDMA may be interchangeably usable.

Figure 19:
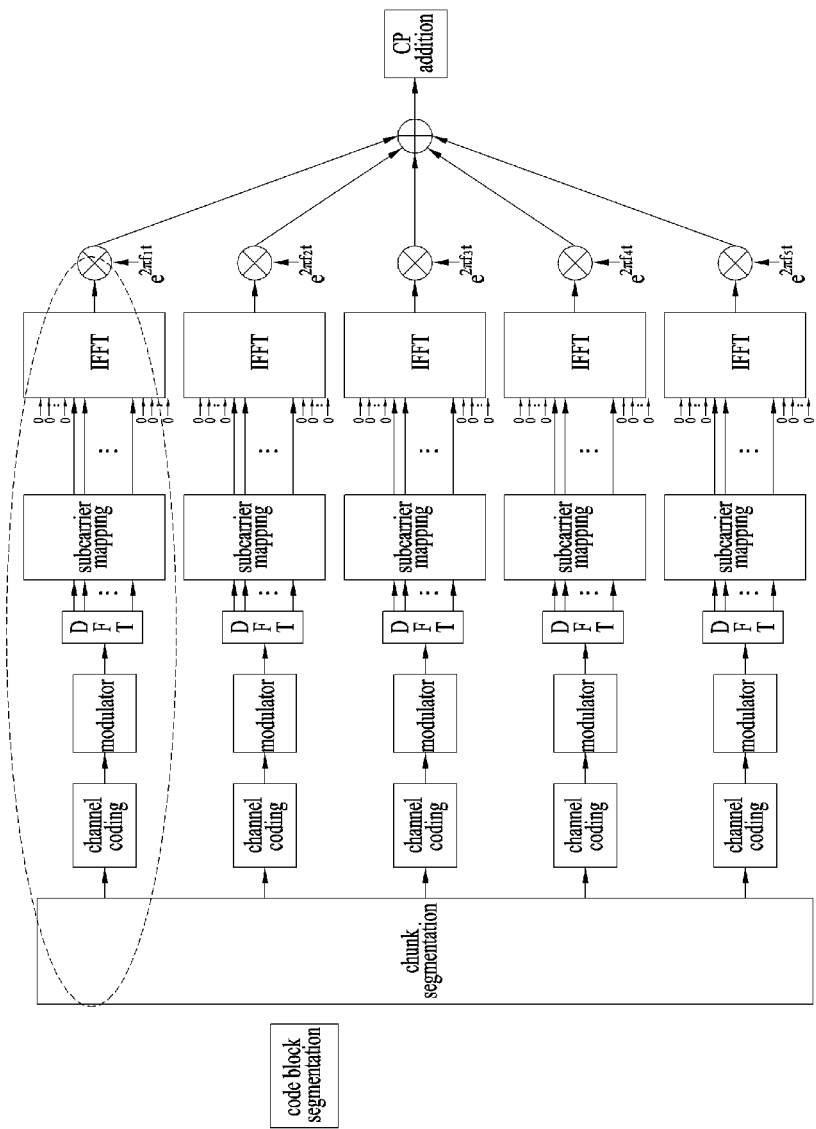

FIG. 19 is a diagram to describe a chuck-specific DFT-s-OFDMA scheme of performing DFT processing, frequency domain mapping and IFFT processing by chunk unit. The chunk-specific DFT-s-OFDMA may be called Nx SC-FDMA. A code block segmented signal is chunk-segmented into parts and channel coding and modulation is performed on each of the parts. The modulated signal undergoes the DFT processing, the frequency domain mapping and the IFFT processing in the same manner described with reference to FIG. 12, outputs from the respective IFFTs are added up, and CP may be added thereto. The Nx SC-FDMA scheme mentioned with reference to FIG. 19 may be applicable to a contiguous multi-carrier (or multi-cell) case and a non-contiguous multi-carrier (or multi-cell) case both.

Structure of MIMO System

Figure 20:
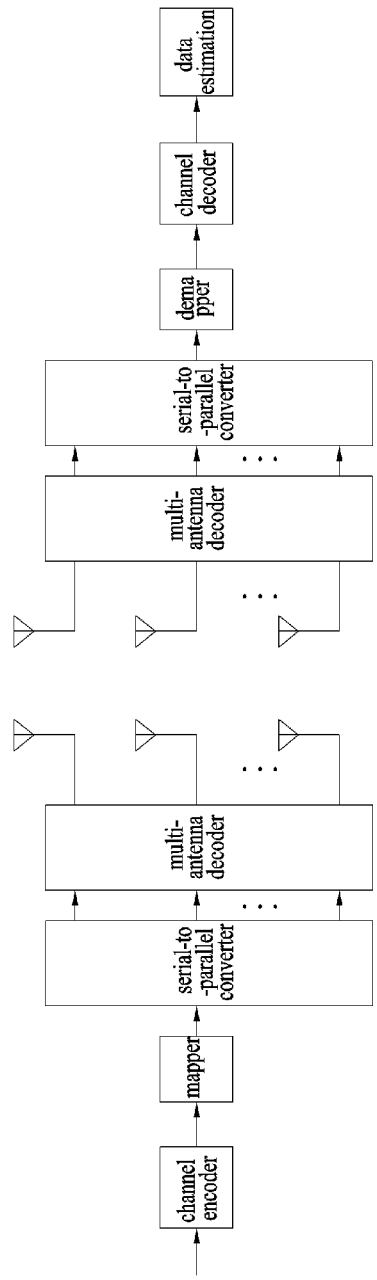
FIG. 20 is a diagram for a structure of an MIMO system.

FIG. 20 is a diagram to illustrate a basic structure of MIMO system having multiple Tx antennas and/or multiple Rx (receiving) antennas. Each block shown in FIG. 20 conceptionally indicates a function or operation in a transmitting/receiving end for MIMO transmission.

A channel encoder shown in FIG. 20 indicates an operation of attaching a redundancy bit to an input data bit, whereby effect of noise and the like from a channel can be reduced. A mapper indicates an operation of converting data bit information to data symbol information. A serial-to-parallel converter indicates an operation of converting serial data to parallel data. A multi-antenna encoder indicates an operation of transforming a data symbol into a time-spatial signal. A multi-antenna of a transmitting end plays a role in transmitting this time-spatial signal on a channel, while a multi-antenna of a receiving end plays a role in receiving the signal on the channel.

A multi-antenna decoder shown in FIG. 20 indicates an operation of transforming the received time-spatial signal into each data symbol. A parallel-to-serial converter indicates an operation of converting a parallel signal to a serial signal. A demapper indicates an operation of transforming a data symbol to a bit information. A decoding operation for a channel code is performed by a channel decoder, whereby data can be estimated.

The MIMO transceiving system mentioned in the above description may have a single or several codewords spatially in accordance with a space multiplexing ratio. A case of having a single codeword spatially is called a single codeword (SCW) structure. And, a case of having several codewords is called a multiple codeword (MCW) structure.

Figure 21:
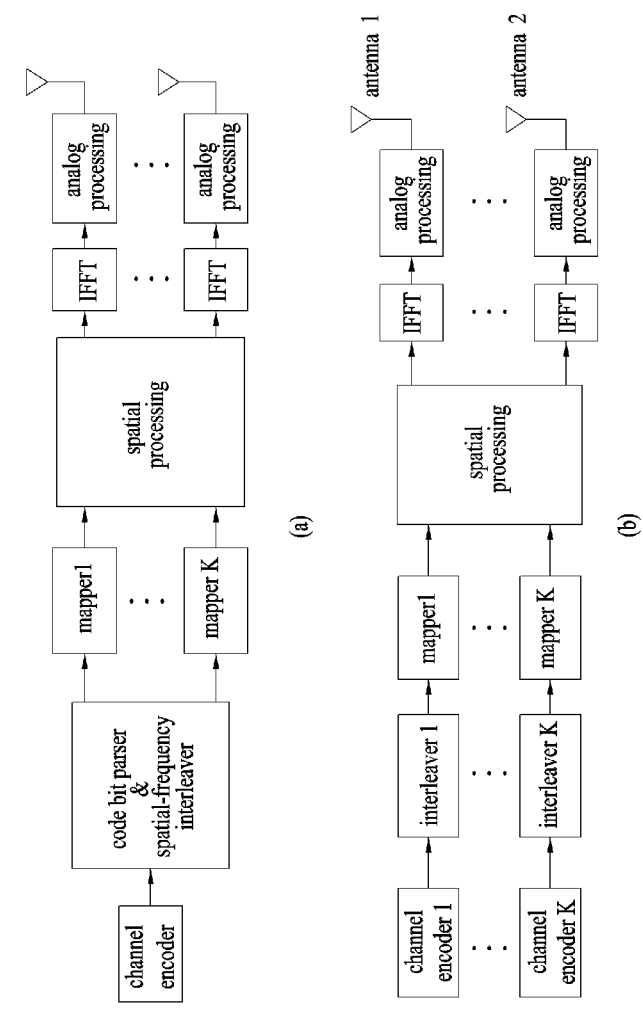
FIG. 21 is a block diagram to describe functionality of an MIMO system.

FIG. 21 (a) is a block diagram to represent functionality of a transmitting end of an MIMO system having the SCW structure. And, FIG. 21 (b) is a block diagram to represent functionality of a transmitting end of an MIMO system having the MCW structure.

Codebook Based Precoding Scheme

In order to support multi-antenna transmission, it may be able to apply precoding of appropriately distributing transmission information to each antenna in accordance with a channel status and the like. A codebook based precoding scheme means the scheme performed in a following manner. First of all, a set of precoding matrixes is determined in a transmitting end and a receiving end. Secondly, the transmitting end measures channel information from the transmitting end and then feeds back information (i.e., a precoding matrix index (PMI)) indicating what is a most appropriate precoding matrix to the transmitting end. Finally, the transmitting end applies an appropriate precoding to a signal transmission based on the PMI. Since the appropriate precoding matrix is selected from the previously determined precoding matrix set, although an optimal precoding is not always applied, this is more advantageous than the explicit feedback of optimal precoding information actually carried on channel information in reducing feedback overhead.

Figure 22:
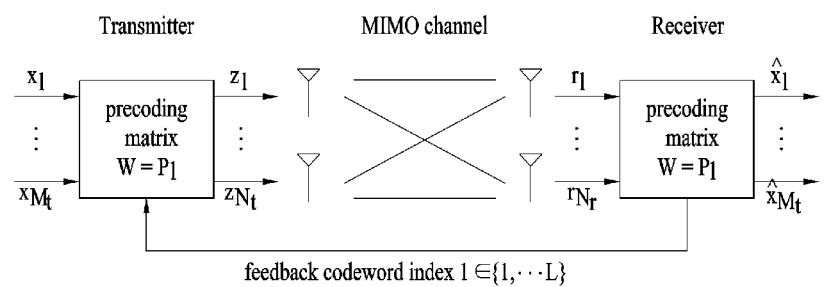
FIG. 22 is a diagram to describe a basic concept of codebook based precoding.

FIG. 22 is a diagram to describe basic concept of codebook based precoding.

According to a codebook based precoding scheme, a transmitting and a receiving end share codebook information including a prescribed number of precoding matrixes in accordance with a transmission rank, the number of antennas and the like. In particular, in case that feedback information is finite, it is able to use the precoding based codebook scheme. The receiving end measures a channel status via a received signal and is then able to deed back information (i.e., indexes of the corresponding precoding matrixes) on the finite number of preferred precoding matrixes based on the above-mentioned codebook information to the transmitting end. For instance, the receiving end is able to select an optimal precoding matrix in a manner of measuring a received signal by ML (maximum likelihood) or MMSE (minimum mean square error) scheme. FIG. 22 shows that the receiving end transmits the precoding matrix information per codeword to the transmitting end, by which the present invention may be non-limited.

Having received the feedback information from the receiving end, the transmitting end may be able to select a specific precoding matrix from the codebook based on the received information. Having selected the precoding matrix, the transmitting end performs a precoding in a manner of multiplying layer signals, of which number corresponds to the transmission rank, by the selected precoding matrix and may be then able to transmit a precoded transmission signal via a plurality of antennas. In the precoding matrix, the number of rows is equal to that of the antennas and the number of columns is equal to a rank value. Since the rank value is equal to the number of the layers, the number of the columns is equal to the number of layers. For instance, if the number of the Tx antennas and the number of the transmission layers are 4 and 2, respectively, the precoding matrix can be configured with 4×2 matrix. Information transmitted via each layer can be mapped to each antenna via the precoding matrix.

Having received the signal precoded and transmitted by the transmitting end, the receiving end is able to reconstruct the received signal by performing a processing inverse to that of the precoding performed by the transmitting end. Generally, since the precoding matrix meets such a unitary matrix (U) condition as $U*U^H = I$, the inverse processing of the precoding may be performed in a manner of multiplying the received signal by Hermit matrix ($P^H$) of the precoding matrix (P) used for the precoding of the transmitting end.

For instance, Table 4 in the following indicates a codebook used for a downlink transmission using 2 Tx antennas in 3GPP LTE Release-8/9 and Table 5 indicates a codebook used for a downlink transmission using 4 Tx antennas in 3GPP LTE Release-8/9.

TABLE 4

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{1234\}}/2$ |

TABLE 5-continued

| Codebook index | $u_n$ | Number of layers $\upsilon$ | | | |
|---|---|---|---|---|---|
| | | 1 | 2 | 3 | 4 |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{1234\}}/2$ |
| 4 | $u_4 = [1\ (-1-j)/2\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/2\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/2\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1234\}}/2$ |
| 7 | $u_7 = [1\ (-1+j)/2\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1234\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -i\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1234\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1234\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1234\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{1234\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5, $W_n^{[s]}$ is obtained from a set {S} configured from a formula expressed as $W_n = I - 2u_n u_n^H / u_n^H u_n$. In this case, I indicates 4×4 unitary matrix and $u_n$ indicates a value given by Table 5.

Referring to Table 4, when a codebook for 2 Tx antennas has total 7 precoding vectors/matrixes, since a unitary matrix is provided for an open-loop system, there are total 6 precoding vectors/matrixes for the precoding of a closed-loop system. Moreover, referring to Table 5, a codebook for 4 Tx antennas has total 64 precoding vectors/matrixes.

The above-mentioned codebooks have such a common property as a constant modulus (CM) property, a nested property, a constrained alphabet property and the like. According to the CM property, each element of every precoding matrix within a codebook does not contain '0' and is configured to have the same size. According to the nested property, a precoding matrix of a low rank is designed to be configured with a subset of a specific column of a precoding matrix of a high rank. According to the constrained alphabet property, each element of every precoding matrix within a codebook is constrained. For instance, each element of a precoding matrix is limited only to an element (±1) used for BPSH (binary phase shift keying), elements (±1,±j) used for QPSK (quadrature phase shit keying), or elements $$\left(\pm 1, \pm j, \pm \frac{(1+j)}{\sqrt{2}}, \pm \frac{(-1+j)}{\sqrt{2}}\right)$$

used for 8-PSK. In the example of the codebook shown in Table 5, since alphabet of each element of every precoding matrix within the codebook is configured with $$\left\{\pm 1, \pm j, \pm \frac{(1+j)}{\sqrt{2}}, \pm \frac{(-1+j)}{\sqrt{2}}\right\},$$

it may be represented as having the constrained alphabet property.

Feedback Channel Structure

Basically, since a base station is unable to know information on a DL channel in FDD system, channel information fed back by a user equipment is used for a DL transmission. In case of the legacy 3GPP LTE Release-8/9 system, it is able to feed back DL channel information via PUCCH or PUSCH. In case of the PUCCH, channel information is periodically fed back. In case of the PUSCH, channel information is aperiodically fed back in accordance with a request made by a base station. Moreover, feedback of channel information may be performed in a manner of feeding back the channel information on a whole frequency band (i.e., wideband (WB)) or the channel information on a specific number of RBs (i.e., subband (SB)).

Extended Antenna Configuration

Figure 23:
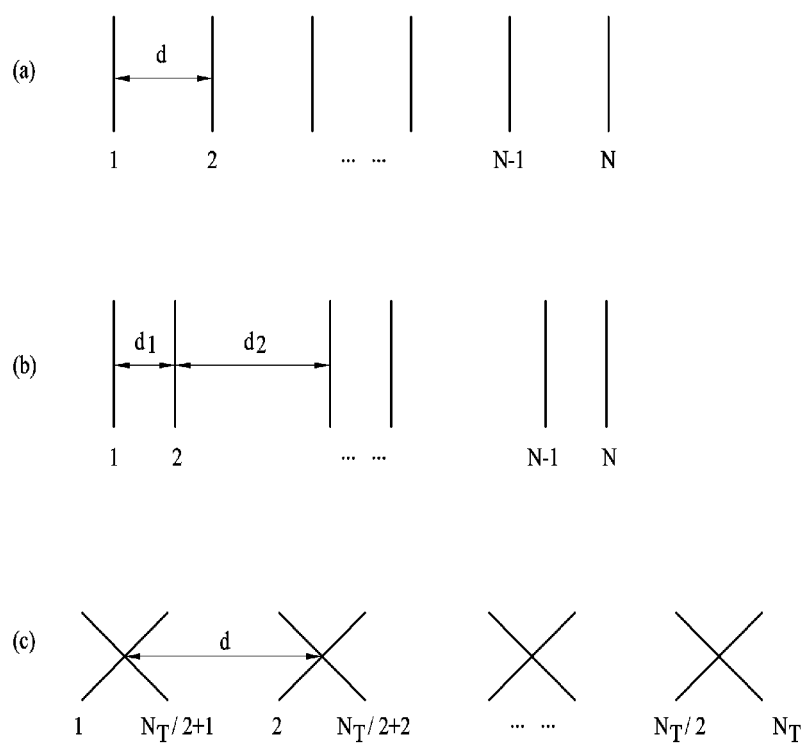
FIG. 23 is a diagram for examples of configuring 8 transmitting antennas.

FIG. 23 shows examples of configuration of 8 Tx (transmitting) antennas.

FIG. 23 (a) shows a case that N antennas configure independent channels without being grouped, which is generally called ULA (uniform linear array). In case that the number of antennas is small, the ULA configuration may be available. In case that the number of antennas is big, multiple antennas are arranged in a manner being spaced apart from each other. Hence, it may be insufficient for a space of a transmitter and/or receiver to configure independent channels.

FIG. 23 (b) shows an antenna configuration (i.e., paired ULA) of ULA type in which 2 antennas form a pair. In this case, an associated channel is established between a pair of the antennas and may be independent from that of antennas of another pair.

Meanwhile, unlike the fact that the legacy 3GPP LTE Release-8/9 system uses 4 Tx antennas in DL, the 3GPP LTE Release-10 system is able to use 8 Tx antennas in DL. In order to apply this extended antenna configuration, it is necessary to install several Tx antennas in insufficient space. Thus, the ULA antenna configuration shown FIG. 23 (a) or FIG. 23 (b) may become inappropriate. Therefore, it may be able to consider applying a dual-polarized (or cross-polarized) antenna configuration shown in FIG. 23 (c). In case of this configuration of Tx antennas, even if a distance 'd' between antennas is relatively short, it is able to configure independent channels by lowering correlation. Therefore, data transmission of high throughput can be achieved.

Codebook Structures

If a transmitting end and a receiving end share a pre-defined codebook with each other, it is able to lower an overhead for the receiving end to feed back precoding information to be used for MIMO transmission from the transmitting end. Hence, it is able to apply efficient precoding.

For one example of configuring a pre-defined codebook, it is able to configure a precoder matrix using DFT (discrete Fourier transform) matrix or Walsh matrix. Alternatively, it is able to configure precoders of various types by combination with a phase shift matrix, a shift diversity matrix or the like.

In configuring a DFT matrix based codebook, n×n DFT matrix can be defined as Formula 3.

$$DFTn: D_n(k, \ell) = \frac{1}{\sqrt{n}} \exp(-j2\pi k\ell/n), \qquad [\text{Formula 3}]$$

$$k, \ell = 0, 1, \ldots, n-1$$

In the DFT matrix of Formula 3, a single matrix exists for a specific size n only. Hence, in order to appropriately define and use various kinds of precoding matrixes in accordance with a situation, it may be able to consider configuring to use a rotated version of the DFTn matrix in addition. One example of the rotated DFTn matrix is shown in Formula 4.

$$\text{rotated } DFTn: D_n^{(G,g)}(k, \ell) = \frac{1}{\sqrt{n}} \exp(-j2\pi k(\ell + g/G)/n), \qquad [\text{Formula 4}]$$

$$k, \ell = 0, 1, \ldots, n-1,$$

$$g = 0, 1, \ldots, G.$$

In case that the DFT matrix shown in Formula 4 is configured, it is able to create G rotated DFTn matrixes. And, the created matrixes may meet the property of the DFT matrix.

In the following description, a householder-based codebook structure is explained. The householder-based codebook structure may mean the codebook configured with householder matrix. In particular, the householder matrix is the matrix used for householder transform. The householder transform is a sort of linear transformation and may be usable in performing QR decomposition. The QR decomposition may mean that a prescribed matrix is decomposed into an orthogonal matrix (Q) and an upper triangular matrix (R). The upper triangular matrix means a square matrix of which components below main diagonal components are all zeros. One example of the 4×4 householder matrix is shown in Formula 5.

$$M_1 = \qquad [\text{Formula 5}]$$

$$I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$u_0^T = [1 \ -1 \ -1 \ -1]$$

It is able to create 4×4 unitary matrix having the CM property by householder transformation. Like the codebook for the 4 Tx antennas shown in Table 5, n×n precoding matrix is created using the householder transformation and a column subset of the created precoding matrix can be configured to be used as a precoding matrix for a transmission of a rank smaller than n.

Multi-Codebook Based Precoder Creation

A precoding operation used for a multi-antenna transmission may be explained as an operation of mapping a signal transmitted via layer(s) to antenna(s). In particular, by X×Y precoding matrix, Y transmission layers (or streams) can be mapped to X Tx antennas.

In order to configure $N_t \times R$ precoding matrix used in transmitting R streams (i.e., Rank R) via $N_t$ Tx antennas, a transmitting end receives a feedback of at least one precoding matrix index (PMI) from a receiving end and is then able to configure a precoder matrix. Formula 6 shows one example of a codebook configured with $n_c$ matrixes.

$$P_{N_t \times R}(k) \in \{(P_1^{N_t \times R}, P_2^{N_t \times R}, P_3^{N_t \times R}, \ldots, P_{n_c}^{N_t \times R})\} \qquad [\text{Formula 6}]$$

In Formula 6, k indicates a specific resource index (e.g., a subcarrier index, a virtual resource index, a subband index, etc.). Formula 6 may be configured in form of Formula 7.

$$P_{N_t \times R}(k) = \begin{bmatrix} P_{M_t \times R, 1} \\ P_{M_t \times R, 2} \end{bmatrix}, \qquad [\text{Formula 7}]$$

$$N_t = 2 \cdot M_t$$

In Formula 7, $P_{M_t \times R, 2}$ may be configured in form of shifting $P_{M_t \times R, 1}$ by a specific complex weight $w_2$. Hence, if a difference between $P_{M_t \times R, 1}$ and $P_{M_t \times R, 2}$ is represented as a specific complex weight, it may be expressed as Formula 8.

$$P_{N_t \times R}(k) = \begin{bmatrix} w_1 \cdot P_{M_t \times R, 1} \\ w_2 \cdot P_{M_t \times R, 1} \end{bmatrix} \qquad [\text{formula 8}]$$

Moreover, Formula 8 may be represented as Formula 9 using Kroneker product ($\otimes$).

$$P_{N_t \times R, n, m}(k) = \begin{bmatrix} w_1 \\ w_2 \end{bmatrix} \otimes P_{M_t \times R, 1} = W_n \otimes P_m \qquad [\text{Formula 9}]$$

Kroneker product is an operation for 2 matrixes in random size. As a result of Kroneker product operation, it is able to obtain a block matrix. For instance, Kroneker product of an m×n matrix A and a p×q matrix B (i.e., A⊗B) may be represented as Formula 10. In Formula 10, $a_{mn}$ indicates an element of the matrix A and $b_{pq}$ indicates an element of the matrix B.

$$A \otimes B = \begin{bmatrix} a_{11}b_{11} & a_{11}b_{12} & \cdots & a_{11}b_{1q} & \cdots & \cdots & a_{1n}b_{11} & a_{1n}b_{12} & \cdots & a_{1n}b_{1q} \\ a_{11}b_{21} & a_{11}b_{22} & \cdots & a_{11}b_{2q} & \cdots & \cdots & a_{1n}b_{21} & a_{1n}b_{22} & \cdots & a_{1n}b_{2q} \\ \vdots & \vdots & \ddots & \vdots & & & \vdots & \vdots & \ddots & \vdots \\ a_{11}b_{p1} & a_{11}b_{p2} & \cdots & a_{11}b_{pq} & \cdots & \cdots & a_{1n}b_{p1} & a_{1n}b_{p2} & \cdots & a_{1n}b_{pq} \\ \vdots & \vdots & & \vdots & \ddots & & \vdots & \vdots & & \vdots \\ \vdots & \vdots & & \vdots & & \ddots & \vdots & \vdots & & \vdots \\ a_{m1}b_{11} & a_{m1}b_{12} & \cdots & a_{m1}b_{1q} & \cdots & \cdots & a_{mn}b_{11} & a_{mn}b_{12} & \cdots & a_{mn}b_{1q} \\ a_{m1}b_{21} & a_{m1}b_{22} & \cdots & a_{m1}b_{2q} & \cdots & \cdots & a_{mn}b_{21} & a_{mn}b_{22} & \cdots & a_{mn}b_{2q} \\ \vdots & \vdots & \ddots & \vdots & & & \vdots & \vdots & \ddots & \vdots \\ a_{m1}b_{p1} & a_{m1}b_{p2} & \cdots & a_{m1}b_{pq} & \cdots & \cdots & a_{mn}b_{p1} & a_{mn}b_{p2} & \cdots & a_{mn}b_{pq} \end{bmatrix}$$

[Formula 10]

A partial matrix $$\begin{bmatrix} w_1 \\ w_2 \end{bmatrix}$$

of precoding and $P_{M_t \times R,1}$ in Formula 9 may be independently fed back from a receiving end. And, a transmitting end is able to configure and use a precoder like Formula 8 or Formula 9 using each feedback information. In case of applying the form of Formula 8 or Formula 9, W is always configured in form of 2×1 vector and may be configured in form of a codebook shown I Formula 11.

$$W \in \begin{bmatrix} 1 \\ e^{j\frac{2\pi}{N}i} \end{bmatrix}, i = 0, \ldots, N-1 \quad \text{[Formula 11]}$$

In Formula 11, N indicates the total number of precoding vectors contained in the codebook and i may be used as an index of a vector. In order to obtain proper performance by minimizing feedback overhead, i may be usable by being set to 2, 4 or 8. Moreover, $P_{M_t \times R,1}$ may be configured as a codebook for 4 Tx antennas or a codebook for 2 Tx antennas. For this, the codebook of Table 4 or Table 5 (e.g., the codebook for 2 or 4 Tx antennas defined in 3GPP LTE Release-8/9) is usable. And, $P_{M_t \times R,1}$ may be configured in rotated DFT form as well.

Moreover, a matrix W may be available in form of 2×2 matrix. Formula 12 shows one example of the 2×2 matrix W.

$$P_{N_t \times 2R,n,m}(k) = \begin{bmatrix} w_1 & w_3 \\ w_2 & w_4 \end{bmatrix} \otimes P_{M_t \times R,1} = W_n \otimes P_m, \quad \text{[Formula 12]}$$

$$N_t = 2 \cdot M_t$$

In case of the configuration of Formula 12, if a maximum rank of the codebook $P_{M_t \times R,1}$ is R, it may be able to design a codebook of a rank up to 2R. For instance, in case of using the codebook shown in Table 4 as $P_{M_t \times R,1}$, according to Formula 9, it may be usable up to 4 (R=4) as a maximum rank. On the other hand, according to Formula 12, it may be able to use a maximum rank up to 8 (2R=8). Hence, in the system configured with 8 Tx antennas, it is able to configure a precoder capable of 8×8 transmission. In this case, W may be configured in form of a codebook shown in Formula 13.

$$W \in \begin{bmatrix} 1 & 1 \\ e^{j\frac{2\pi}{N}i} & -e^{j\frac{2\pi}{N}i} \end{bmatrix}, \quad \text{[Formula 13]}$$

$$i = 0, \ldots, N-1$$

The precoder configuring method according to Formula 9 or Formula 12 may apply differently in accordance with each rank. For instance, the method of Formula 9 is used for a case of a rank equal to or lower than 4 (R≤4). And, the method of Formula 12 may be used for a case of a rank equal to or higher than 5 (R≥5). Alternatively, the method of Formula 9 is used only for a case of a rank 1 (R=1). In other cases (i.e., rank 2 or higher (R≥2)), it may be able to use the method of Formula 12. The W and P mentioned in association with Formula 9 and Formula 12 may be fed back to have the property as shown in Table 6.

TABLE 6

| Case | W/P |
| --- | --- |
| Frequency granularity 1 | One of two matrixes may be configured to be fed back on subband and the other may be configured to be fed back on wideband. |
| Frequency granularity 2 | One of two matrixes may be configured to be fed back on nest-M band and the other may be configured to be fed back on wideband. |
| Time granularity | One of two matrixes may be configured to be fed back by periods N and the other may be configured to be fed back by periods M. |
| Feedback channel 1 | One of two matrixes may be configured to be fed back on PUSCH and the other may be configured to be fed back on PUCCH. |
| Feedback channel 2 | In case of feedback on PUSCH, one (e.g., W) of two matrixes may be configured to be fed back on subband and the other (e.g., P) may be configured to be fed back on wideband. In case of feedback on PUCCH, both Q and P may be configured to be fed back on wideband. |
| Unequal protection | One (e.g., P) of two matrixes may be configured to be coded at a more reliable rating rate and the other (e.g., W) may be configured to be coded at a relatively low coding rate. |

TABLE 6-continued

| Case | W/P |
|---|---|
| Alphabet restriction 1 | Alphabet of a matrix W may be configured to be constrained by BPSK and alphabet of a matrix P may be configured to be constrained by QPSK or 8 PSK. |
| Alphabet restriction 2 | Alphabet of a matrix W may be configured to be constrained by QPSK and alphabet of a matrix P may be configured to be constrained by QPSK or 8 PSK. |

In the following description, a multi-codebook based precoder having the nested property is explained.

First of all, it is able to configure a codebook using the method of Formula 9 and the method of Formula 12 appropriately. Yet, in some cases, it may be impossible to configure a precoder unless using two kinds of combinations. To solve this problem, it may be able to configure and use a precoder as shown in Formula 14.

$$P_{N_t \times N_t, n, m} = \begin{bmatrix} w_1 & w_3 \\ w_2 & w_4 \end{bmatrix} \otimes P_{M_t \times M_t} = W_n \otimes P_m, N_t = 2 \cdot M_t \quad \text{[Formula 14]}$$

A precoder for a case that a rank value is equal to the number of Tx antennas ($R=N_t$) is configured using the $P_{N_t \times N_t}$ obtained from Formula 14 and a column subset of the configured precoder may be usable as a precoder for a lower rank. If the precoder is configured in the above manner, the nested property can be met to simplify the CQI calculation. In Formula 14, $P_{N_t \times N_t, n, m}$ indicates the precoder in case of $R=N_t$. In this case, for example, a subset configured with $0^{th}$ and $2^{nd}$ columns of $P_{N_t \times N_t, n, m}$ may be usable for a precoder for R=2, which can be represented as $P_{N_t \times N_t, n, m}(0,2)$. In this case, $P_{M_t \times M_t}$ may be configured with a rotated DFT matrix or a codebook of another type.

Meanwhile, in order to raise a diversity gain in an open-loop environment, based on the precoder configured in the above manner, it is able to maximize the beam diversity gain by exchanging to use a precoder in accordance with a specific resource. For instance, in case of using the precoder according to the method of Formula 9, a method of applying a precoder in accordance with a specific resource may be represented as Formula 15.

$$P_{N_t \times R, n, m}(k) = W_{k \bmod n_c} \otimes P_{k \bmod m_c} \quad \text{[Formula 15]}$$

In Formula 15, k indicates a specific resource region. A precoding matrix for a specific resource region k is determined by such a modulo operation as Formula 15. In this case, $n_c$ and $m_c$ may indicate a size or subset of a codebook for matrix W and a size or subset of a codebook for a matrix P, respectively.

Like Formula 15, if cycling is applied to each of the two matrixes, complexity may increase despite maximizing a diversity gain. Hence, long-term cycling may be set to be applied to a specific matrix and short-term cycling may be set to be applied to the rest of the matrixes.

For instance, the matrix W may be configured to perform a modulo operation in accordance with a physical resource block (PRB) index and the matrix P may be configured to perform a modulo operation in accordance with a subframe index. Alternatively, the matrix W may be configured to perform a modulo operation in accordance with a subframe index and the matrix P may be configured to perform a modulo operation in accordance with a physical resource block (PRB) index.

For another instance, the matrix W may be configured to perform a modulo operation in accordance with a physical resource block (PRB) index and the matrix P may be configured to perform a modulo operation in accordance with a subband index. Alternatively, the matrix W may be configured to perform a modulo operation in accordance with a subband index and the matrix P may be configured to perform a modulo operation in accordance with a physical resource block (PRB) index.

Moreover, a precoder cycling using a modulo operation is applied to one of the two matrixes only and the other may be fixed to use.

Codebook Configuration for 8 Tx Antennas

In the 3GPP LTE Release-10 system having an extended antenna configuration (e.g., 8 Tx antennas), the feedback scheme used by the legacy 3GPP LTE Release-8/9 may be applied in a manner of being extended. For instance, it is able to feed back such channel state information (CSI) as RI (Rank Indicator), PMI (Precoding Matrix Index), CQI (Channel Quality Information) and the like. In the following description, a method of designing a dual precoder based feedback codebook usable for a system supportive of an extended antenna configuration is explained. In the dual precoder based feedback codebook, in order to indicate a precoder to be used for MIMO transmission of a transmitting end, a receiving end may be able to transmit a precoding matrix index (PMI) to the transmitting end. In doing so, a precoding matrix may be indicated by combination of 2 different PMIs. In particular, the receiving end feeds back 2 different PMIs (i.e., $1^{st}$ PMI and $2^{nd}$ PMI) to the transmitting end. Subsequently, the transmitting end determines the precoding matrix indicated by the combination of the $1^{st}$ and $2^{nd}$ PMIs and is then able to apply the determined precoding matrix to the MIMO transmission.

IN designing the dual precoder based feedback codebook, it may be able to consider 8-Tx antenna MIMO transmission, single user-MIMO (SU-MIMO) and multiple user-MIMO (MU-MIMO) supports, compatibility with various antenna configurations, codebook design references, codebook size and the like.

As a codebook applicable to 8-Tx antenna MIMO transmission, it may be able to consider designing a feedback codebook. In particular, this feedback codebook supports SU-MIMO only in case of a rank higher than 2, is optimized for both SU-MIMO and MU-MIMO in case of a rank equal to or lower than 2, and is compatible with various antenna configurations.

In case of MU-MIMO, user equipments participating in MU-MIMO are preferably separated in correlation domain. Hence, the codebook for MU-MIMO needs to be designed to correctly operate on a channel having high correlation. Since DFT vectors provide good performance on a channel having high correlation, it may be able to consider having DFT vector contained in a codebook set of a rank up to a rank-2. In high scattering propagation environment (e.g., an indoor environment having many reflective waves, etc.)

capable of producing many space channels, SU-MIMO operation may be preferred as the MIMO transmission scheme. Hence, it may be able to consider designing a codebook for a rank higher than the rank-2 to have god performance in separating multiple layers.

In designing a precoder for MIMO transmission, it is preferable that one precoder structure has good performance for various antenna configurations (e.g., low-correlation, high-correlation, cross-pole, etc.). In arrangement of 8 Tx antennas, a cross-polarized array having an antenna interval of 4λ may be formed in a low-correlation antenna configuration, a ULA having an antenna interval of 0.5λ may be formed in a high-correlation antenna configuration, or a cross-polarized array having an antenna interval of 0.5λ may be formed in a cross-polarized antenna configuration. The DFT based codebook structure may be able to provide good performance for the high-correlation antenna configuration. Meanwhile, block diagonal matrixes may be more suitable for the cross-polarized antenna configuration. Hence, in case that a diagonal matrix is introduced into a codebook for 8 Tx antennas, it is able to configure a codebook that provides god performance for all antenna configurations.

As mentioned in the foregoing description, the codebook design reference is to meet the unitary codebook, the CM property, the constrained alphabet, the proper codebook size, the nested property and the like. This applies to the 3GPP LTE Release-8/9 codebook design. And, it may be able to consider applying such a codebook design reference to the 3GPP LTE Release-10 codebook design supportive of the extended antenna configuration.

Regarding the codebook size, it is necessary to increase the codebook size to sufficiently support the advantage in using 8 Tx antennas. In order to obtain a sufficient precoding gain from 8 Tx antennas in environment with low correlation, a codebook in large size (e.g., a codebook in size over 4 bits for Rank 1 or Rank 2) may be required. In order to obtain a precoding gain in an environment with high correlation, a codebook in 4-bit size may be sufficient. Yet, in order to achieve a multiplexing gain of MU-MIMO, it may be able to increase a codebook size for Rank 1 or Rank 2.

Based on the above description, general structures of a codebook for 8 Tx antennas are explained as follows.

Codebook Structure (1)

In applying multi-granular feedback, a method of configuring a codebook for 8 Tx antennas by combination of 2 base matrixes and a method of configuring the combination of 2 base matrixes using an inner product are described as follows.

First of all, a method of using an inner product of 2 base matrices may be represented as Formula 16.

$$W = \tilde{W}_1 \tilde{W}_2 \qquad \text{[Formula 16]}$$

In case that codebook for 8 Tx antennas is represented in form of an inner product, a $1^{st}$ base matrix may be represented as a diagonal matrix shown in Formula 17 for a co-polarized antenna group.

$$\tilde{W}_1 = \begin{bmatrix} W_1 & 0 \\ 0 & W_1 \end{bmatrix} (W_1 : 4 \times N) \qquad \text{[Formula 17]}$$

Moreover, in case that a $2^{nd}$ base matrix is used to adjust a relative phase between polarizations, the $2^{nd}$ base matrix may be represented using an identity matrix. For an upper rank of a codebook for 8 Tx antennas, the $2^{nd}$ base matrix may be represented as Formula 18. In Formula 18, a relation between a coefficient '1' of a $1^{st}$ row of the $2^{nd}$ base matrix and a coefficient 'a' or '−a' of a $2^{nd}$ row thereof may be able to reflect the adjustment of a relative phase between orthogonal polarizations.

$$\tilde{W}_2 = \begin{bmatrix} I & I \\ aI & -aI \end{bmatrix} (I : N \times N) \qquad \text{[Formula 18]}$$

Hence, if the codebook for 8 Tx antennas is represented using the $1^{st}$ base matrix and the $2^{nd}$ base matrix, it can be represented as Formula 19.

$$W = \begin{bmatrix} W_1 & 0 \\ 0 & W_1 \end{bmatrix} \begin{bmatrix} I & I \\ aI & -aI \end{bmatrix} = \begin{bmatrix} W_1 & W_1 \\ aW_1 & -aW_1 \end{bmatrix} \qquad \text{[Formula 19]}$$

The codebook expressed using the inner product like Formula 19 can be simplified into Formula 20 using Kroneker product.

$$W = W_2 \otimes W_1 (W_1 : 4 \times N, W_2 : 2 \times M) \qquad \text{[Formula 20]}$$

In Formula 20, a precoding matrix included in a codebook W includes 4*2 rows and N*M columns. Hence, it can be used as a codebook for 8 Tx antennas and transmission of Rank 'N*M'. For instance, in case of configuring a codebook for 8 Tx antennas and transmission of Rank R, if $W_2$ is configured with 2×M, a value N for $W_1$ becomes R/M. For instance, in case of configuring a codebook for 8 Tx antennas and transmission of Rank 4, if $W_2$ is configured with 2×2 (i.e., M=2) matrix (e.g., the matrix shown in Formula 13), $W_1$ may apply 4×2 (i.e., N=R/M=4/2=2) matrix (e.g., DFT matrix).

Codebook Structure (2)

Another method of configuring a codebook for 8 Tx antennas by combination of 2 base matrixes is described as follows. Assuming that the 2 base matrixes are set to W1 and W2, respectively, a precoding matrix W for configuring a codebook may be defined in form of W1*W2. For Rank 1 to Rank 8, W1 may be able to have such a form of a block diagonal matrix as $$\begin{bmatrix} X & 0 \\ 0 & X \end{bmatrix}.$$

For Rank 1 to Rank 4, X corresponding to a block of a block diagonal matrix W1 may be configured with a matrix in size of 4×Nb. And, 16 4Tx DFT beams can be defined for the X. In this case, beams indexes may be given as 0, 1, 2, . . . , and 15, respectively. For each W1, the adjacent overlapping beams may be usable to reduce an edge effect in frequency-selective precoding. Hence, even if a codebook is configured using the same W1 for an identical or different W2, optimal performance can be secured for several subbands.

For Rank 1 and Rank 2, X corresponding to a block diagonal matrix W1 may be configured with a matrix in size of 4×4 (i.e., Nb=4). For each of Rank 1 and Rank 2, 8 W1 matrixes can be defined. And, one W1 may include beams overlapping with the adjacent W1. In case that beam indexes are given as 0, 1, 2, . . . , and 15, respectively, for example, it is able to configure 8 W1 matrixes, of which beams overlapping with the adjacent W1 matrix, such as {0, 1, 2, 3}, {2, 3, 4, 5}, {4, 5, 6, 7}, {6, 7, 8, 9}, {8, 9, 10, 11}, {10, 11, 12, 13}, {12, 13, 14, 15}, and {14, 15, 0, 1}. For instance, a W1 codebook for Rank 1 or Rank 2 may be defined as Formula 21.

$$X^{(n)} = \frac{1}{2} \times \begin{bmatrix} 1 & 0 & 0 & 0 \\ 0 & e^{j\frac{\pi}{4}n} & 0 & 0 \\ 0 & 0 & e^{j(2)\frac{\pi}{4}n} & 0 \\ 0 & 0 & 0 & e^{j(3)\frac{\pi}{4}n} \end{bmatrix}$$ [Formula 21]

$$\begin{bmatrix} 1 & 1 & 1 & 1 \\ 1 & e^{j\frac{\pi}{8}} & e^{j(2)\frac{\pi}{8}} & e^{j(3)\frac{\pi}{8}} \\ 1 & e^{j(2)\frac{\pi}{8}} & e^{j(2)(2)\frac{\pi}{8}} & e^{j(3)(2)\frac{\pi}{8}} \\ 1 & e^{j(3)\frac{\pi}{8}} & e^{j(2)(3)\frac{\pi}{8}} & e^{j(3)(3)\frac{\pi}{8}} \end{bmatrix},$$

$$n = 0, 1, 2, \ldots, 7$$

$$W_1^{(n)} = \begin{bmatrix} X^{(n)} & 0 \\ 0 & X^{(n)} \end{bmatrix},$$

$$CB_1 = \{W_1^{(0)}, W_1^{(1)}, W_1^{(2)}, \ldots, W_1^{(7)}\}$$

In Formula 21, X(n) corresponding to a block of a block diagonal matrix W1$^{(n)}$ is defined and a W1 codebook (CB$_1$) can be configured with 8 different W1's.

Considering the selection and common-phase component of W2, the selection of 4 kinds of different matrixes is possible for Rank 1 and 4 kinds of different QPSK co-phases are applicable for Rank 1. Hence, total 16 W2 matrixes can be defined. For instance, the W2 codebook (CB$_2$) for Rank 1 can be configured as Formula 22.

$$W_2 \in CB_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$ [Formula 22]

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

For Rank 2, the selection of 4 kinds of different matrixes is possible and 2 kinds of different QPSK co-phases are applicable. Hence, total 8 W2 matrixes can be defined. For instance, the W2 codebook (CB$_2$) for Rank 2 can be configured as Formula 23.

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}$$ [Formula 23]

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

Subsequently, for Rank 3 and Rank 4, X corresponding to a block diagonal matrix W1 may be configured with a matrix in size of 4×8 (i.e., Nb=8). For each of Rank 3 and Rank 4, 4 W1 matrixes can be defined. And, one W1 may include beams overlapping with the adjacent W1. In case that beam indexes are given as 0, 1, 2, . . . , and 15, respectively, for example, it is able to configure 4 W1 matrixes, of which beams overlapping with the adjacent W1 matrix, such as {0, 1, 2, . . . , 7}, {4, 5, 6, . . . , 11}, {8, 9, 10, . . . , 15}, and {12, . . . , 15, 0, . . . , 3}. For instance, a W1 codebook for Rank 3 or Rank 4 may be defined as Formula 24.

$$X^{(n)} = \frac{1}{2} \times \begin{bmatrix} 1 & 0 & 0 & 0 \\ 0 & (j)^n & 0 & 0 \\ 0 & 0 & (-1)^n & 0 \\ 0 & 0 & 0 & (-j)^n \end{bmatrix}$$ [Formula 24]

$$\begin{bmatrix} 1 & 1 & 1 & \ldots & 1 \\ 1 & e^{j\frac{\pi}{8}} & e^{j(2)\frac{\pi}{8}} & \ldots & e^{j(7)\frac{\pi}{8}} \\ 1 & e^{j(2)\frac{\pi}{8}} & e^{j(2)(2)\frac{\pi}{8}} & \ldots & e^{j(7)(2)\frac{\pi}{8}} \\ 1 & e^{j(3)\frac{\pi}{8}} & e^{j(2)(3)\frac{\pi}{8}} & \ldots & e^{j(7)(3)\frac{\pi}{8}} \end{bmatrix},$$

$$n = 0, 1, 2, 3$$

$$W_1^{(n)} = \begin{bmatrix} X^{(n)} & 0 \\ 0 & X^{(n)} \end{bmatrix},$$

$$CB_1 = \{W_1^{(0)}, W_1^{(1)}, W_1^{(2)}, W_1^{(3)}\}$$

In Formula 24, X(n) corresponding to a block of a block diagonal matrix W1$^{(n)}$ is defined and a W1 codebook (CB$_1$) can be configured with 4 different W1's.

Considering the selection and common-phase component of W2, the selection of 8 kinds of different matrixes is possible for Rank 3 and 2 kinds of different QPSK co-phases are applicable for Rank 3. Hence, total 16 W2 matrixes can be defined. For instance, the W2 codebook (CB$_2$) for Rank 3 can be configured as Formula 25.

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$ [Formula 25]

$$(Y_1, Y_2) \in \left\{ \begin{array}{l} (e_1, [e_1 \ e_5]), (e_2, [e_2 \ e_6]), (e_3, [e_3 \ e_7]), (e_4, [e_4 \ e_8]), \\ (e_5, [e_1 \ e_5]), (e_6, [e_2 \ e_6]), (e_7, [e_3 \ e_7]), (e_8, [e_4 \ e_8]) \end{array} \right\}$$

In Formula 24, $e_n$ indicates 8×1 vector, $n^{th}$ element has a value of 1, and the rest of elements mean a selection vector having a value of 0.

For Rank 4, the selection of 4 kinds of different matrixes is possible and 2 kinds of different QPSK co-phases are applicable. Hence, total 8 W2 matrixes can be defined. For instance, the W2 codebook (CB$_2$) for Rank 4 can be configured as Formula 26.

$$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}$$ [Formula 26]

$$Y \in \{[e_1 \ e_5], [e_2 \ e_6], [e_3 \ e_7], [e_4 \ e_8]\}$$

For Rank 5 to Rank 8, X corresponding to a block of a block diagonal matrix W1 can be configured with DFT matrix in size of 4×4 and one W1 matrix can be defined. W2 may be defined as a product of a matrix $$\begin{bmatrix} I & I \\ I & -I \end{bmatrix}$$

and a row selection matrix in a fixed size of 8×r. For Rank 5, since selection of 4 kinds of different matrixes is possible, 4 W2 matrixes can be defined. For Rank 6, since selection of 4 kinds of different matrixes is possible, 4 W2 matrixes can be defined. For Rank 7, since selection of 1 kind of a matrix is possible, one W2 matrix can be defined. For Rank 8, since selection of 1 kind of a matrix is possible, one W2 matrix can be defined. In this case, the matrix $$\begin{bmatrix} I & I \\ I & -I \end{bmatrix}$$

is introduced to enable all polarized groups for each transmission layer to be identically used and good performance may be expected for a transmission of a high rank having a spatial channel having more scattering. In this case, the I means an identity matrix.

For instance, the W1 codebook or the W2 codebook for Rank 5 to Rank 8 can be defined as Formula 27.

$$X = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix},$$ [Formula 27]

$$W_1 = \begin{bmatrix} X & 0 \\ 0 & X \end{bmatrix},$$

$$CB_1 = \{W_1\}$$

$$W_2 \in CB_2 = \left\{ \frac{1}{\sqrt{2}} \begin{bmatrix} I_4 & I_4 \\ I_4 & -I_4 \end{bmatrix} Y \right\}$$

In Formula 27, the W1 codebook for Rank 5 to Rank 8 is configured with one W1 matrix only. $I_4$ in the W2 codebook for Rank 5 to Rank 8 means an identity matrix in size of 4×4. In Formula 27, a matrix Y can be defined as one of Formula 28 to Formula 31 for example.

The matrix Y for Rank 5 can be defined as Formula 28.

$$Y \in \left\{ \begin{matrix} [e_1 \ e_2 \ e_3 \ e_4 \ e_5], [e_2 \ e_3 \ e_4 \ e_5 \ e_6], \\ [e_3 \ e_4 \ e_5 \ e_6 \ e_7], [e_4 \ e_5 \ e_6 \ e_7 \ e_8] \end{matrix} \right\}$$ [Formula 28]

The matrix Y for Rank 6 can be defined as Formula 29.

$$Y \in \left\{ \begin{matrix} [e_1 \ e_2 \ e_3 \ e_4 \ e_5 \ e_6], [e_2 \ e_3 \ e_4 \ e_5 \ e_6 \ e_7], \\ [e_3 \ e_4 \ e_5 \ e_6 \ e_7 \ e_8], [e_4 \ e_5 \ e_6 \ e_7 \ e_8 \ e_1] \end{matrix} \right\}$$ [Formula 29]

The matrix Y for Rank 7 can be defined as Formula 30.

$$Y = [e_1 e_2 e_3 e_4 e_5 e_6 e_7]$$ [Formula 30]

The matrix Y for Rank 8 can be defined as Formula 31.

$$T = I_8$$ [Formula 31]

In Formula 31, the Is means 8×8 identity matrix.

As mentioned in the foregoing description, the numbers of W1's, which can be defined for each of Rank 1 to Rank 8, are added up to result in 28 (=8+8+4+4+1+1+1+1).

On the basis of the 3D MIMO system to which the 2-dimensional active antenna system (2D-AAS) proposed in the present invention is applied, explained is a method of transmitting a reference signal (RS) to be used for determining the direction of a beam in case that a base station transmits a signal to a user equipment (UE).

Unlike wireless communication systems before the legacy LTE/LTE-A Release 11, an antenna system that utilizes the AAS has been discussed in wireless communication systems after LTE Rel-12. Since each antenna in the AAS corresponds to an active antenna including an active circuit, an antenna pattern can be changed depending on a communication situation. Thus, it is advantageous in that interference is reduced and that beamforming can be efficiently performed.

Moreover, if the AAS is deployed in two dimensions (i.e., 2D-AAS), in terms of the antenna pattern, a main lobe of the antenna can be adjusted in the horizontal direction and beam can be adjusted in the vertical direction as well. In other words, in the case of 2D-AAS, the beam adaptation can be performed more efficiently in three dimensions. Furthermore, it is possible to actively change a transmitting beam depending on a location of a UE through the above efficient beam adaptation.

Figure 24:
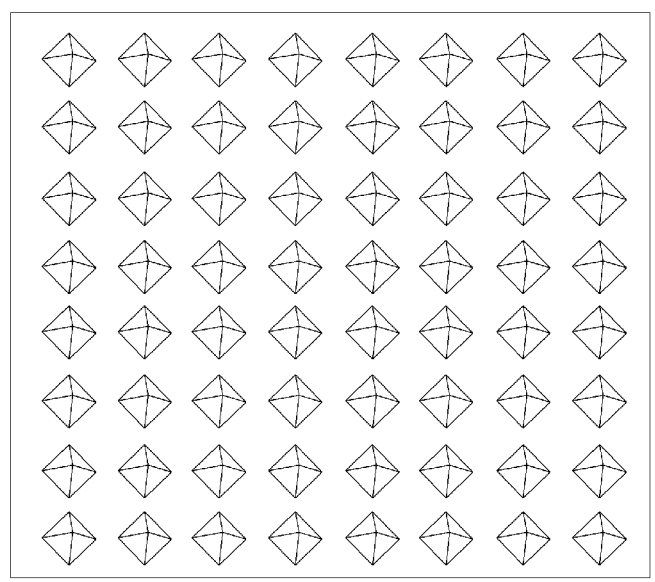
FIG. 24 is a reference diagram of a 2-dimensional active antenna system according to the present invention.

Referring to FIG. 24, as one example of the aforementioned 2D-AAS, a system with multiple antennas can be established in a manner of arranging antennas in the vertical direction and the horizontal direction.

In case that the 2D-AAS is used, a base station needs to transmit CSI-RS in order to inform a UE of a channel from the base station to the UE. In the legacy LTE system, CSI-RS is configured as 2 port, 4 port, or 8 ports CSI-RS. For each N-ports CSI-RS, N resource elements should be used in one RB. Thus, if the 2D-AAS is established with total 64 antennas by arranging 8 antennas in the vertical direction and 8 antennas in the horizontal direction, 64 REs are used in one RB for CSI-RS according to the legacy LTE system. In this case, it may cause a problem that CSI-RS overhead is increased due to the number of antennas.

Therefore, the present invention proposes a method for solving the above-mentioned problem that the CSI-RS overhead increases in FDD system.

To help the understanding of the present invention, described is one example of methods for preventing increase of the CSI-RS overhead in the legacy FDD system. According to the legacy FDD system, entire vertical and horizontal antenna elements are divided into N groups in consideration of CSI-RS transmission. Such grouping may be previously promised between a transmitting end and a receiving end or be semi-statically configured through RRC signaling. M beam directions are promised in the group in advance. And, the beam direction may be defined according to precoding in the antenna group.

When transmitting CSI-RS to a UE, a base station transmits N ports corresponding to the number of groups generated by grouping the antenna elements. And, the base station configures M CSI-RSs in a manner of configuring the predetermined number M of the beam directions in the group.

For instance, in FIG. 24, 8 antenna ports in the horizontal direction can be generated by making bundles of 8 antennas in the vertical direction. Thereafter, the base station may configure the number M of 8 port CSI-RSs in a manner of assigning M of vertical beam directions for the beam direction indicated by each of the ports. In the above-mentioned configuration, if assuming that an antenna beam becomes extremely thinner, the number M is consequently increased. If the number M increases, it may cause a problem that entire CSI-RS overhead is increased proportionately.

Hereinafter, another method for preventing increase of the CSI-RS overhead in the legacy FDD system is described. When CSI-RS is transmitted, entire vertical and horizontal antenna elements are divided into N groups. Such grouping may be previously promised between a transmitting end and a receiving end or be semi-statically configured through RRC signaling. If a base station requests a UE to transmit SRS, the UE transmits the SRS to the base station in an uplink band. Subsequently, the base station determines beam directions in the antenna group based on the received uplink SRS and then transmits to the UE N-port CSI-RSs for N antenna ports, which are generated from the above process. Although the UE transmits the SRS using the uplink band, a channel used in this case can be assumed to be similar to a channel in a downlink band in a long-term perspective. Compared to the case of using the CSI-RS, it is advantageous in that the CSI-RS overhead is reduced since the SRS is used for determining the beam directions in the group. However, this method may be not suitable for dynamic beam adaptation since the base station performs calculation in a manner of collecting SRS during a long term.

For instance, in FIG. 24, 8 antenna ports in the horizontal direction can be generated by making bundles of 8 antennas in the vertical direction. Thereafter, a beam direction indicated by each of the ports (consisting of 8 vertical antenna elements) are calculated by collecting uplink SRS during a long term. In this case, if assuming that a UE moves fast towards a base station using a vehicle, since a vertical antenna beam based on the uplink SRS is determined by being associated with a trajectory of the moving UE, it may indicate a somewhat incorrect direction.

Therefore, the present invention proposes a method of determining a new beam direction, which is capable of complementing the above-mentioned problems of the two methods in the legacy wireless communication system.

According to the present invention, entire vertical and horizontal antenna elements are divided into N groups in consideration of CSI-RS transmission. Such grouping may be previously promised between a transmitting end and a receiving end or be semi-statically configured through RRC signaling.

Thus, after setting the grouping, a base station configures MBSFN subframes in subframes corresponding to partial or full band for the number $N_{UE}$ (where, $N_{UE}$ is the number of UEs that need to transmit RSs) of UEs. Since the MBSFN subframe configured in such a manner is not designed for actual multicast or broadcast, it is hereinafter referred to as an F-MBSFN (fake MBSFN) subframe. In particular, the F-MBSFN subframe is to receive a reference signal (RS) transmitted by a UE in a downlink band instead of in an uplink band. Although the present invention is mainly described with reference to the F-MBSFN, the configuration according to the present invention can be applied to a case that a downlink subframe is changed into an uplink subframe or a special subframe.

The base station configures F-MBSFN subframes so that the number $N_{UE}$ of the UEs transmits reference signals through the F-MBSFN subframes. In particular, although the reference signal mapped to the F-MBSFN subframe is similar to the SRS in that a UE transmits as a reference signal, since it may have a design/structure different from that of the reference signal defined in the legacy LTE system, the reference signal mapped to the F-MBSFN subframe is hereinafter referred to as D-SRS. In this case, the base station may configure a portion of the F-MBSFN subframe in which each of the UEs transmits the D-SRS together. Further, such a D-SRS transmission location may be semi-statically configured through RRC signaling.

Moreover, according to the present invention, the above-mentioned D-SRS may be transmitted using the F-MBSFN across the entire frequency band, the D-SRS may be separately configured for each UE by a symbol unit or in each frequency band for the efficient use. For example, 3 OFDM symbols may be assigned for the D-SRS in frequency band A and 4 OFDM symbols may be assigned for the D-SRS in frequency band B. Furthermore, after defining locations of a plurality of D-SRSs, multiple D-SRSs can be dynamically configured in some cases.

In addition, the remaining resource elements (REs), which is not used for configuring the D-SRS, in the F-MBSFN subframe may be used for PDSCH in downlink or signals (e.g., PUCCH, PUSCH, HARQ-ACK, SRS) in uplink.

When the D-SRS is configured by the symbol unit or in each frequency band, a lower bound of the OFDM symbol may be configured. For instance, symbols 0, 1 and 2 among OFDM symbols 0 to 13 are assigned for PDCCH in the F-MBSFN subframe. When the legacy UE intends to measure CRS in this region, the legacy UE assumes that a UE adjacent to the corresponding legacy UE transmits the D-SRS in OFDM symbol 3. According to the above assumption, the UE may transmit the D-SRS before a prescribed time due to TA (timing alignment). Thus, the legacy UE, which is located adjacent to the UE that transmits the D-SRS, may be affected by the D-SRS transmitted from the adjacent UE (i.e., the UE that transmits the D-SRS) at a timing of receiving the CRS. In order to mitigate the above-mentioned effect, the lower bound may be configured so that the D-SRS is configured starting from a symbol appearing after a predetermined OFDM symbol. In this case, the lower bound may be configured through high layer signaling (e.g., RRC signaling).

The number $N_{UE}$ of the UEs transmits D-SRSs in locations configured for D-SRS transmission. And, the base station determines a beam direction in an antenna group for each UE by measuring a channel between the transmitting end and the receiving end based on the received D-SRSs. Moreover, the number $S_{UE}$ of groups (where, $S_{UE}$ is the number of scheduled UE groups and $S_{UE} \leq N_{UE}$) can be selected from scheduled UEs based on the received D-SRSs. In particular, $S_{UE}$ groups are formed by grouping UEs having similar beam directions in the antenna group. After the beam directions in the antenna group in each of the UE groups are set to the same value, CSI-RSs are set equal to the number of the UE groups. Thus, the base station configures the number $S_{UE}$ of N-port CSI-RSs for the UEs.

In particular, after calculating RI, PMI and CQI based on received CSI-RSs, the selected $S_{UE}$ UE groups provide feedback to the base station. The base station selects the number S'$_{UE}$ (where, S'$_{UE}$ is the number of selected UEs and S'$_{UE}$≤S$_{UE}$) of UEs for data transmission through scheduling based on the fed back CSI information. Thereafter, in order to transmit data to the selected S'$_{UE}$ UEs, the base station applies the beam direction in the antenna group calculated through the D-SRSs to the antenna group and applies precoding between antenna groups based the fed back CSI information. Through the above processes, the base station transmits data.

Hereinafter, a scheduling method according to the present invention is described in detail. According to the method, scheduling can be performed in two steps. In particular, first scheduling is performed immediately after a base station receives D-SRS. And, after the first scheduling is performed, second scheduling is also performed immediately after the base station receives feedback of CSI.

If a channel assigned through the D-SRS is identical to a channel for data transmission, the base station may perform only one time scheduling immediately after receiving the D-SRS. Moreover, the base station does not transmit CSI-RS later but may calculate both precoding in an antenna group and precoding between antenna groups, which correspond to precoding for data transmission, based on the D-SRS.

However, in case of channel measurement using D-SRS, there may be difference between a transmission channel and a reception channel depending on an actual environment. Therefore, in order to determine overall beam directions more accurately, according to the present invention, scheduling is performed twice. In particular, in first scheduling, partial UEs are selected. And, in second scheduling, final UEs (or UEs in a multi-user system) are selected and precoding suitable for the final UEs is selected. However, if too many UEs are selected in the first scheduling, it may cause an overhead problem since CSI-RS needs to be configured for each of the selected UEs. Thus, according to the present invention, UEs are grouped in the first scheduling. First of all, several groups are generated by combining UEs having similar beam directions in the antenna group among N$_{UE}$ UEs. After the beam directions in the antenna group in each of the UE groups are set to the same value, CSI-RSs are set equal to the number of the UE groups.

Thus, according to the present invention, the UE groups are selected in a manner of receiving D-SRS from the UEs after F-MBSFN configuration. Thereafter, final precoding and scheduling are performed in a manner that the base station transmits CSI-RS. However, the present invention can be also applied to the following case. In particular, it operates without using CSI-RS after a single UE (or a plurality of UEs in the case of the multi-user system) is finally selected through scheduling by receiving D-SRSs from the UEs.

Therefore, the present invention may have two advantages. The first advantage is that CSI-RS overhead can be reduced. If only one UE is selected in the first scheduling, one N-port CSI-RS can be configured. Thus, compared to a scheme of configuring the number M of N-port CSI-RSs by configuring CSI-RS for each direction in an antenna group, which corresponds to the conventional scheme of using CSI-RS only, the CSI-RS overhead can be reduced. The second advantage is that a beam direction can be determined dynamically compared to the conventional scheme of using SRS through an uplink band. Since D-SRS is received through a downlink band in a manner of configuring F-MBSFN, a beam direction in an antenna group can be determined dynamically instead of over a long term. And, this may enable a UE with high mobility to perform accurate data transmission.

Hereinafter, a problem of interference with a neighbor cell is additionally described.

If a transmitter corresponds to a base station, transmission power of the transmitter may have a value greater than transmission power of a receiver. In case that D-SRSs are transceived according to the present invention, when neighbor cells transmit downlink signals, receivers in a serving cell may transmit D-SRSs through a downlink band. In this case, the D-SRSs may receive considerable interference due to the downlink signals from the neighbor cells.

To solve the above-mentioned interference problem, two methods are proposed in the present invention.

According to the first method for solving the interference problem in the present invention, a serving cell may inform neighbor cells of an SRS transmission location in a band having F-MBSFN configured therein through backhaul. As mentioned in the foregoing description, D-SRS may be separately configured by a symbol unit or in each band for each UE. After informing that the neighbor cells perform muting on a symbol/band related to D-SRS transmission, the neighbor cells can perform muting on the corresponding symbol/band using information received through the backhaul. Alternatively, after signaling that the neighbor cells simultaneously configure F-MBSFN, UEs in all the cells that configure F-MBSFN may be configured to transmit D-SRSs. In this case, D-SRS transmission locations may be overlapped between the cells or may be different to avoid interference between D-SRSs.

According to the second method for solving the interference problem in the present invention, neighbor cells can share locations of semi-statically empty resource elements with each other. If some cells determine that interference from neighbor cells is not significant, they may receive D-SRS after configuring F-MBSFN.

Hereinafter, problems that may arise in a UE and methods for solving the problems are described.

There may be a case that a UE needs to transmit an uplink signal in a slot having F-MBSFN configured therein according to the present invention. In this case, if the UE has one RF (radio frequency) circuit, the UE may not transmit D-SRS proposed in the present invention and the uplink signal at the same time. And, even if the UE has a plurality of RF circuits, the UE may not simultaneously transmit D-SRS and the uplink signal due to maximum power of the corresponding UE. Therefore, according to the present invention, transmission priority of D-SRS and an uplink signal needs to be indicated.

Therefore, according to the present invention, the transmission priority is proposed in a manner of separating into a case of allowing simultaneous transmission using a plurality of carriers (hereinafter referred to as Case A) and a case of not allowing simultaneous transmission (hereinafter referred to as Case B) as follows.

In case of periodic uplink signal

Case A (allowed case): If max power limitation is not met, power of the uplink signal (e.g., PUCCH, PUSCH, PRACH, or SRS) is firstly reduced rather than power of D-SRS.

Case B (not allowed case): The uplink signal (e.g., PUCCH, PUSCH, PRACH, or SRS) is dropped. In this case, a UE considers that there is no scheduling/configuration for the uplink signal such as PUCCH, PUSCH, PRACH, or SRS in a D-SRS transmission frame.

In case of aperiodic uplink signal, power of PRACH, HARQ-ACK, aperiodic SRS or PUSCH can be controlled as follows.

Case A (allowed case): If max power limitation is not met, power of D-SRS is firstly reduced rather than power of the uplink signal (e.g., PRACH, HARQ-ACK, aperiodic SRS or PUSCH).

Case B (not allowed case): D-SRS is dropped. It is preferred to firstly receive the aperiodic uplink signal rather than D-SRS since it may be interpreted as a situation that the aperiodic uplink signal is configured despite of that D-SRS transmission from a base station is expected.

In addition, the present invention is described in terms of TA (timing alignment). In case of D-SRS transmission by configuring F-MBSFN, each UE assumes TA to be uplink TA in D-SRS transmission. However, in case of uplink signal transmission, if there are a plurality of base stations that receives the uplink signal (e.g., CoMP operation), TA considering a plurality of the base stations can be assumed.

Moreover, in terms of power control in the present invention, in case that D-SRS is received by configuring F-MBSFN, a UE may accept power control of uplink SRS. However, on the contrary, power can be independently controlled.

Furthermore, the present invention is also described in terms of CP (cyclic prefix). If D-SRS is received by configuring F-MBSFN, a UE may accept one of the following CP assumptions i) to iv).

i) Normal CP: This may be assumed for reception without a delay irrespective of a delay profile of a channel.
ii) Extended CP: This may be assumed to minimize effect of a delay profile of a channel.
iii) CP of PDSCH of MBSFN in DL: This is a value set in downlink. If assuming a delay profile, there is no problem in transmission and reception.
iv) CP of uplink subframe FIG. 25 is a diagram for configurations of a base station device and a user equipment device according to the present invention.

Figure 25:
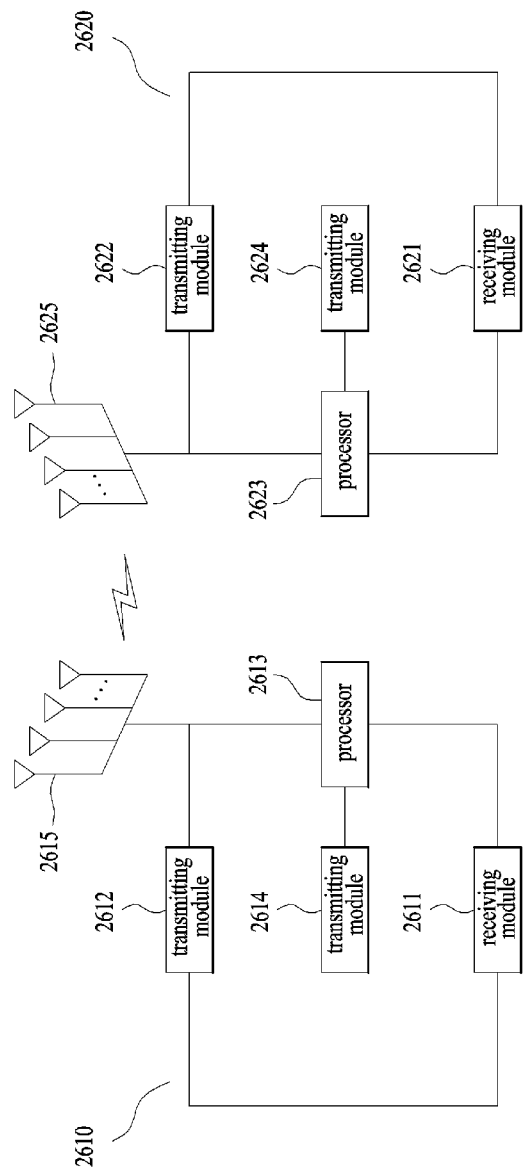
FIG. 25 is a diagram for configurations of a base station device and a user equipment device according to the present invention.

Referring to FIG. 25, a base station device 2510 according to the present invention may include a receiving module 2511, a transmitting module 2512, a processor 2513, a memory 2514 and a plurality of antennas 2515. In this case, a plurality of the antennas 2515 may mean a base station device that supports MIMO transmission and reception. The receiving module 2511 may receive various signals, data, information and the like in uplink from a user equipment. The transmitting module 2512 may transmit various signals, data, information and the like in downlink to the user equipment. Moreover, the processor 2513 may be configured to control overall operations of the base station device 2510.

The processor 2513 of the base station device 2510 performs a function of processing information received by the base station device 2510, information to be externally transmitted and the like. The memory 2514 may store the processed information and the like for prescribed duration and be substituted with such a component as a buffer (not shown in the drawing) or the like.

Referring to FIG. 25, a user equipment device 2520 according to the present invention may include a receiving module 2521, a transmitting module 2522, a processor 2523, a memory 2524 and a plurality of antennas 2525. In this case, a plurality of the antennas 2525 may mean a user equipment device that supports MIMO transmission and reception. The receiving module 2521 may receive various signals, data, information and the like in downlink from a base station. The transmitting module 2522 may transmit various signals, data, information and the like in uplink to the base station. Moreover, the processor 2523 may be configured to control overall operations of the user equipment device 2520.

The processor 2523 of the user equipment device 2520 performs a function of processing information received by the user equipment device 2520, information to be externally transmitted and the like. The memory 2524 may store the processed information and the like for prescribed duration and be substituted with such a component as a buffer (not shown in the drawing) or the like.

The detailed configurations of the base station device and the user equipment device mentioned in the above description may be implemented in a manner that the matters of various embodiments of the present invention mentioned in the foregoing description are independently applied or that at least two embodiments of the present invention are simultaneously applied. And, redundant contents may be omitted for clarity.

In the description with reference to FIG. 25, the description of the base station device 2510 may be identically applicable to a relay device as a downlink transmission entity or an uplink reception entity. And, the description of the user equipment device 2520 may be identically applicable to a relay device as a downlink reception entity or an uplink transmission entity.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

The present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope matching the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

Although a method and apparatus for transmitting a reference signal in a wireless communication system supporting multiple antennas are mainly described with reference to the examples of applying to 3GPP LTE system, as mentioned in the foregoing description, the present invention is applicable to various kinds of wireless communication systems as well as to the 3GPP LTE system.

What is claimed is:

1. A method of transmitting a reference signal by a transmitting end in a wireless communication system supporting multiple antennas, the method comprising:
configuring a $1^{st}$ antenna group on a basis of a plurality of antenna elements including horizontal domain antenna elements and vertical domain antenna elements;
transmitting a configuration for a specific subframe to a user equipment group through the $1^{st}$ antenna group;
receiving an SRS (sounding reference signal) through the specific subframe from the user equipment group;
selecting at least one user equipment from the user equipment group on a basis of the SRS; and
transmitting a CSI-RS (channel state information-reference signal) to the at least one user equipment,
wherein at least a portion of a resource region in the specific subframe is configured as an MBSFN (multicast broadcast single frequency network) subframe, and
wherein the at least one user equipment is selected from the user equipment group with reference to a beam direction measured based on the SRS.

2. The method of claim 1, wherein the SRS is transmitted through a specific resource region, which is configured as the MBSFN subframe, in the specific subframe.

3. The method of claim 2, wherein the specific resource region corresponds to a specific frequency band and wherein the specific resource region is configured different for each of the user equipment group.

4. The method of claim 2, wherein the specific resource region comprises at least one symbol having an index greater than a pre-defined symbol index.

5. The method of claim 2, wherein the specific resource region is configured through high layer signaling.

6. The method of claim 1, wherein the configuration for the specific subframe is announced to at least one neighbor cell.

7. The method of claim 1, wherein if the SRS and a periodic uplink signal are simultaneously transmitted in the specific subframe, while a sum of transmission power for the SRS and transmission power for the periodic uplink signal exceeds maximum power configured for the specific subframe, the transmission power for the periodic uplink signal is reduced.

8. The method of claim 1, wherein if the SRS and a periodic uplink signal are not simultaneously transmitted in the specific subframe, the periodic uplink signal configured in the specific subframe is dropped.

9. The method of claim 1, wherein if the SRS and an aperiodic uplink signal are simultaneously transmitted in the specific subframe, while a sum of transmission power for the SRS and transmission power for the aperiodic uplink signal exceeds maximum power configured for the specific subframe, the transmission power for the SRS is reduced.

10. The method of claim 1, wherein if the SRS and an aperiodic uplink signal are not simultaneously transmitted in the specific subframe, the SRS configured in the specific subframe is dropped.

11. The method of claim 1, wherein the SRS is transmitted by applying uplink timing alignment.

12. The method of claim 1, wherein the SRS is transmitted according to power control of an uplink SRS.

13. A base station configured to transmit a reference signal in a wireless communication system supporting multiple antennas, comprising:
a radio frequency unit; and
a processor,
wherein the processor is configured to form a $1^{st}$ antenna group on a basis of a plurality of antenna elements including horizontal domain antenna elements and vertical domain antenna elements, to transmit a configuration for a specific subframe to a user equipment group through the $1^{st}$ antenna group, to receive an SRS (sounding reference signal) through the specific subframe from the user equipment group, to select at least one user equipment from the user equipment group on a basis of the SRS, and to transmit a CSI-RS (channel state information-reference signal) to the at least one user equipment,
wherein at least a portion of a resource region in the specific subframe is configured as an MBSFN (multicast broadcast single frequency network) subframe, and
wherein the at least one user equipment is selected from the user equipment group with reference to a beam direction measured based on the SRS.

* * * * *